US012742846B1

(12) United States Patent
Lloyd et al.

(10) Patent No.: US 12,742,846 B1
(45) Date of Patent: Sep. 22, 2026

(54) SYSTEMS AND METHODS OF REMOTE OBJECT TRACKING

(71) Applicant: Samsara Inc., San Francisco, CA (US)

(72) Inventors: Kevin Russell Coates Lloyd, San Carlos, CA (US); Neel Sheth, San Francisco, CA (US); Gautam Ravi Ramaswamy, Monmouth Junction, NJ (US); James Michael Rowson, Mamaroneck, NY (US)

(73) Assignee: Samsara Inc., San Francisco, CA (US)

(*) Notice: Subject to any disclaimer, the term of this patent is extended or adjusted under 35 U.S.C. 154(b) by 22 days.

(21) Appl. No.: 18/882,135

(22) Filed: Sep. 11, 2024

Related U.S. Application Data

(63) Continuation of application No. 18/647,246, filed on Apr. 26, 2024, now Pat. No. 12,117,546, which is a (Continued)

(51) Int. Cl.
*G01S 3/786* (2006.01)
*F24S 50/20* (2018.01)
*H02S 20/32* (2014.01)

(52) U.S. Cl.
CPC ............. *G01S 3/7861* (2013.01); *F24S 50/20* (2018.05); *H02S 20/32* (2014.12)

(58) Field of Classification Search
CPC ......... G01S 3/7861; H02S 20/32; F24S 50/20
See application file for complete search history.

(56) References Cited

U.S. PATENT DOCUMENTS 4,671,111 A 6/1987 Lemelson
5,825,283 A 10/1998 Camhi
(Continued)

FOREIGN PATENT DOCUMENTS

CN 111047179 A 4/2020
DE 10 2004 015 221 A1 10/2005
(Continued)

OTHER PUBLICATIONS

"5 Minutes", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0014).
(Continued)

*Primary Examiner* — Tae-Sik Kang
(74) *Attorney, Agent, or Firm* — Knobbe, Martens, Olson & Bear, LLP

(57) ABSTRACT

A management server in communication with one or more object tracking devices is disclosed. The management server may receive location information, configuration information, and orientation information associated with the one or more object tracking devices. Based at least in part on the location information, the management server may receive weather information associated with the locations of the one or more object tracking devices. Based at least in part on the location information, the weather information, the configuration information, and the orientation information, the management server can determine power generated and power consumed by the one or more object tracking devices, which then can be used to determine estimated operation time for the one or more object tracking devices.

20 Claims, 7 Drawing Sheets

Related U.S. Application Data continuation of application No. 18/312,534, filed on May 4, 2023, now Pat. No. 12,000,940, which is a continuation of application No. 16/849,148, filed on Apr. 15, 2020, now Pat. No. 11,675,042.

(60) Provisional application No. 62/991,319, filed on Mar. 18, 2020.

(56) References Cited

U.S. PATENT DOCUMENTS 5,917,433 A 6/1999 Keillor et al.
6,064,299 A 5/2000 Lesesky et al.
6,098,048 A 8/2000 Dashefsky et al.
6,157,864 A 12/2000 Schwenke et al.
6,253,129 B1 6/2001 Jenkins et al.
6,317,668 B1 11/2001 Thibault et al.
6,411,203 B1 6/2002 Lesesky et al.
6,421,590 B2 7/2002 Thibault
6,452,487 B1 9/2002 Krupinski
6,505,106 B1 1/2003 Lawrence et al.
6,651,063 B1 11/2003 Vorobiev
6,714,894 B1 3/2004 Tobey et al.
6,718,239 B2 4/2004 Rayner
6,741,165 B1 5/2004 Langfahl et al.
6,801,920 B1 10/2004 Wischinski
7,117,075 B1 10/2006 Larschan et al.
7,139,780 B2 11/2006 Lee et al.
7,209,959 B1 4/2007 Campbell et al.
7,233,684 B2 6/2007 Fedorovskaya et al.
7,386,376 B2 6/2008 Basir et al.
7,389,178 B2 6/2008 Raz et al.
7,398,298 B2 7/2008 Koch
7,492,938 B2 2/2009 Brinson, Jr. et al.
7,526,103 B2 4/2009 Schofield et al.
7,555,378 B2 6/2009 Larschan et al.
7,596,417 B2 9/2009 Fister et al.
7,606,779 B2 10/2009 Brinson, Jr. et al.
7,715,961 B1 5/2010 Kargupta
7,769,499 B2 8/2010 McQuade et al.
7,844,088 B2 11/2010 Brinson, Jr. et al.
7,859,392 B2 12/2010 McClellan et al.
7,877,198 B2 1/2011 Tenzer et al.
7,881,838 B2 2/2011 Larschan et al.
7,957,936 B2 6/2011 Eryurek et al.
8,019,581 B2 9/2011 Sheha et al.
8,024,311 B2 9/2011 Wood et al.
8,032,277 B2 10/2011 Larschan et al.
8,140,358 B1 3/2012 Ling et al.
8,156,108 B2 4/2012 Middleton et al.
8,156,499 B2 4/2012 Foulger et al.
8,169,343 B2 5/2012 Sheha et al.
8,175,992 B2 5/2012 Bass, II et al.
8,230,272 B2 7/2012 Middleton et al.
8,260,489 B2 9/2012 Nielsen et al.
8,417,402 B2 4/2013 Basir
8,442,508 B2 5/2013 Harter et al.
8,457,395 B2 6/2013 Boncyk et al.
8,509,412 B2 8/2013 Sheha et al.
8,543,625 B2 9/2013 Middleton et al.
8,560,164 B2 10/2013 Nielsen et al.
8,615,555 B2 12/2013 Koch
8,625,885 B2 1/2014 Brinson, Jr. et al.
8,626,568 B2 1/2014 Warkentin et al.
8,633,672 B2 1/2014 Jung et al.
8,669,857 B2 3/2014 Sun et al.
8,682,572 B2 3/2014 Raz et al.
8,706,409 B2 4/2014 Mason et al.
8,831,825 B2 9/2014 Shah et al.
8,836,784 B2 9/2014 Erhardt et al.
8,918,229 B2 12/2014 Hunt et al.
8,953,228 B1 2/2015 Mehers
8,989,914 B1 3/2015 Nemat-Nasser et al.
8,989,959 B2 3/2015 Plante et al.
8,996,240 B2 3/2015 Plante
9,024,744 B2 5/2015 Klose et al.
9,053,590 B1 6/2015 Kator et al.
9,137,498 B1 9/2015 L'Heureux et al.
9,147,335 B2 9/2015 Raghunathan et al.
9,152,609 B2 10/2015 Schwartz et al.
9,165,196 B2 10/2015 Kesavan et al.
9,170,913 B2 10/2015 Hunt et al.
9,189,895 B2 11/2015 Phelan et al.
9,230,250 B1 1/2016 Parker et al.
9,230,437 B2 1/2016 Brinton et al.
9,280,435 B2 3/2016 Hunt et al.
9,311,271 B2 4/2016 Wright
9,344,683 B1 5/2016 Nemat-Nasser et al.
9,349,228 B2 5/2016 Ochsendorf et al.
9,384,111 B2 7/2016 Hunt et al.
9,389,147 B1 7/2016 Lambert et al.
9,402,060 B2 7/2016 Plante
9,412,282 B2 8/2016 Hunt et al.
9,439,280 B2 9/2016 Chang et al.
9,445,270 B1 9/2016 Bicket et al.
9,477,639 B2 10/2016 Fischer et al.
9,477,989 B2 10/2016 Grimm et al.
9,527,515 B2 12/2016 Hunt et al.
9,594,725 B1 3/2017 Cook et al.
9,672,667 B2 6/2017 Mason et al.
9,688,282 B2 6/2017 Cook et al.
9,728,015 B2 8/2017 Kwak
9,761,063 B2 9/2017 Lambert et al.
9,761,067 B2 9/2017 Plante et al.
9,811,536 B2 11/2017 Morris et al.
9,818,088 B2 11/2017 Penilla et al.
9,846,979 B1 12/2017 Sainaney et al.
9,849,834 B2 12/2017 Reed et al.
9,852,625 B2 12/2017 Victor et al.
9,892,376 B2 2/2018 Pfeiffer et al.
9,922,567 B2 3/2018 Molin et al.
9,934,628 B2 4/2018 Kreiner et al.
9,996,980 B1 6/2018 Gonzalez et al.
10,015,452 B1 7/2018 Schofield et al.
10,033,706 B2 7/2018 Bicket et al.
10,040,459 B1 8/2018 Kukreja
10,065,652 B2 9/2018 Shenoy et al.
10,068,392 B2 9/2018 Cook et al.
10,075,669 B2 9/2018 Vanman et al.
10,083,547 B1 9/2018 Tomatsu
10,085,149 B2 9/2018 Bicket et al.
10,094,308 B2 10/2018 Kolhouse et al.
10,102,495 B1 10/2018 Zhang et al.
10,127,810 B2 11/2018 Durie, Jr. et al.
10,157,321 B2 12/2018 Becker et al.
10,173,486 B1 1/2019 Lee et al.
10,173,544 B2 1/2019 Hendrix et al.
10,196,071 B1 2/2019 Rowson et al.
10,206,107 B2 2/2019 Bicket et al.
10,223,935 B2 3/2019 Sweany et al.
10,275,959 B2 4/2019 Ricci
10,286,875 B2 5/2019 Penilla et al.
10,290,036 B1 5/2019 Gella et al.
10,311,749 B1 6/2019 Kypri et al.
10,336,190 B2 7/2019 Yokochi et al.
10,356,577 B1 * 7/2019 Kugler .................. H04W 4/029
10,388,075 B2 8/2019 Schmirler et al.
10,389,739 B2 8/2019 Solotorevsky
10,390,227 B2 8/2019 Bicket et al.
10,444,949 B2 10/2019 Scott et al.
10,445,559 B2 10/2019 Joseph et al.
10,459,444 B1 10/2019 Kentley-Klay
10,460,183 B2 10/2019 Welland et al.
10,460,600 B2 10/2019 Julian et al.
10,471,955 B2 11/2019 Kouri et al.
10,486,709 B1 11/2019 Mezaael
10,489,222 B2 11/2019 Sathyanarayana et al.
10,523,904 B2 12/2019 Mahmoud et al.
10,573,183 B1 2/2020 Li et al.
10,579,123 B2 3/2020 Tuan et al.
10,609,114 B1 3/2020 Bicket et al.
10,621,873 B1 4/2020 Spiel et al.
10,623,899 B2 4/2020 Watkins et al.
10,632,941 B2 4/2020 Chauncey et al.

(56) References Cited

U.S. PATENT DOCUMENTS 10,652,335 B2 5/2020 Botticelli
10,715,976 B2 7/2020 Hoffner et al.
10,762,363 B2 9/2020 Watanabe
10,782,691 B2 9/2020 Suresh et al.
10,788,990 B2 9/2020 Kim et al.
10,789,840 B2 9/2020 Boykin et al.
10,803,496 B1 10/2020 Hopkins
10,818,109 B2 10/2020 Palmer et al.
10,827,324 B1 11/2020 Hajimiri et al.
10,843,659 B1 11/2020 Innocenzi et al.
10,848,670 B2 11/2020 Gatti et al.
10,878,030 B1 12/2020 Lambert et al.
10,969,852 B2 4/2021 Tuan et al.
10,979,871 B2 4/2021 Hajimiri et al.
10,999,269 B2 5/2021 Bicket et al.
10,999,374 B2 5/2021 ElHattab et al.
11,046,205 B1 6/2021 Govan et al.
11,069,257 B2 7/2021 Palmer et al.
11,080,568 B2 8/2021 ElHattab et al.
11,122,488 B1 9/2021 Lloyd et al.
11,126,910 B1 9/2021 Akhtar et al.
11,127,130 B1 9/2021 Jain et al.
11,131,986 B1 9/2021 Gal et al.
11,132,853 B1 9/2021 Akhtar et al.
11,137,744 B1 10/2021 Heddleston et al.
11,142,175 B2 10/2021 Chow et al.
11,158,177 B1 10/2021 ElHattab et al.
11,184,422 B1 11/2021 Bicket et al.
11,188,046 B1 11/2021 ElHattab et al.
11,190,373 B1 11/2021 Stevenson et al.
11,204,637 B2 12/2021 Tuan et al.
11,260,878 B2 3/2022 Palmer et al.
11,341,786 B1 5/2022 Calmer et al.
11,349,901 B1 5/2022 Duffield et al.
11,352,013 B1 6/2022 Srinivasan et al.
11,352,014 B1 6/2022 Srinivasan et al.
11,356,605 B1 6/2022 Shemet et al.
11,356,909 B1 6/2022 Lloyd
11,365,980 B1 6/2022 Akhtar et al.
11,386,325 B1 7/2022 Srinivasan et al.
11,436,844 B2 9/2022 Carruthers et al.
11,451,610 B1 9/2022 Saunders et al.
11,451,611 B1 9/2022 Saunders et al.
11,460,507 B2 10/2022 Lloyd et al.
11,464,079 B1 10/2022 Aschenbener et al.
11,479,142 B1 10/2022 Govan et al.
11,494,921 B2 11/2022 ElHattab et al.
11,522,857 B1 12/2022 Symons et al.
11,532,169 B1 12/2022 Hassan et al.
11,558,449 B1 1/2023 Bicket et al.
11,595,632 B2 2/2023 Tsai et al.
11,599,097 B1 3/2023 Gal et al.
11,606,736 B1 3/2023 Lloyd et al.
11,611,621 B2 3/2023 ElHattab et al.
11,615,141 B1 3/2023 Hoye et al.
11,620,909 B2 4/2023 Tsai et al.
11,627,252 B2 4/2023 Delegard et al.
11,641,388 B1 5/2023 Saunders et al.
11,641,604 B1 5/2023 Lloyd
11,643,102 B1 5/2023 Calmer et al.
11,659,060 B2 5/2023 Davis et al.
11,665,223 B1 5/2023 Duffield et al.
11,669,714 B1 6/2023 Akhtar et al.
11,671,478 B1 6/2023 Saunders et al.
11,674,813 B1 6/2023 Chung et al.
11,675,042 B1 6/2023 Lloyd et al.
11,683,579 B1 6/2023 Symons et al.
11,688,211 B1 6/2023 Calmer et al.
11,694,317 B1 7/2023 Jain et al.
11,704,984 B1 7/2023 ElHattab et al.
11,709,500 B2 7/2023 Lloyd et al.
11,710,409 B2 7/2023 Nanda et al.
11,720,087 B1 8/2023 Heddleston et al.
11,727,054 B2 8/2023 Grandhi et al.
11,731,469 B1 8/2023 McGillan
11,736,312 B1 8/2023 Xiao et al.
11,741,760 B1 8/2023 Dubin et al.
11,748,377 B1 9/2023 Zhang et al.
11,752,895 B1 9/2023 Govan et al.
11,756,346 B1 9/2023 Wu et al.
11,756,351 B1 9/2023 Akhtar et al.
11,758,096 B2 9/2023 Shah et al.
11,776,328 B2 10/2023 Yang et al.
11,780,446 B1 10/2023 Srinivasan et al.
11,782,930 B2 10/2023 McGee et al.
11,787,413 B2 10/2023 Tsai et al.
11,798,187 B2 10/2023 Zaheer et al.
11,798,298 B2 10/2023 Hassan et al.
11,800,317 B1 10/2023 Dugar et al.
11,838,884 B1 12/2023 Dergosits et al.
11,842,577 B1 12/2023 Harrison et al.
11,847,911 B2 12/2023 ElHattab et al.
11,855,801 B1 12/2023 Stevenson et al.
11,861,955 B1 1/2024 Dubin et al.
11,863,712 B1 1/2024 Young et al.
11,866,055 B1 1/2024 Srinivasan et al.
11,868,919 B1 1/2024 Zhang et al.
11,875,580 B2 1/2024 Hassan et al.
11,875,683 B1 1/2024 Tsai et al.
11,890,962 B1 2/2024 Govan et al.
11,937,152 B2 3/2024 Hajimiri et al.
11,938,948 B1 3/2024 Davis et al.
11,959,772 B2 4/2024 Robbins et al.
11,974,410 B1 4/2024 Lin et al.
11,975,685 B1 5/2024 Innocenzi et al.
11,989,001 B1 5/2024 ElHattab et al.
11,995,546 B1 5/2024 Srinivasan et al.
11,997,181 B1 5/2024 Davis et al.
12,000,940 B1 6/2024 Lloyd et al.
12,106,613 B2 10/2024 Calmer et al.
12,117,546 B1 10/2024 Lloyd et al.
12,126,917 B1 10/2024 Shemet et al.
12,128,919 B2 10/2024 Calmer et al.
12,140,445 B1 11/2024 Akhtar et al.
12,150,186 B1 11/2024 Aguilar et al.
12,165,360 B1 12/2024 Jain et al.
12,168,445 B1 12/2024 Srinivasan et al.
12,172,653 B1 12/2024 Akhtar et al.
12,179,629 B1 12/2024 Govan et al.
12,197,610 B2 1/2025 Wen et al.
12,213,090 B1 1/2025 Dergosits et al.
12,228,944 B1 2/2025 Dubin et al.
12,253,617 B1 3/2025 Aguilar et al.
12,256,021 B1 3/2025 Torres et al.
12,260,616 B1 3/2025 Rajan et al.
12,269,498 B1 4/2025 Rommel et al.
12,289,181 B1 4/2025 Stevenson et al.
12,306,010 B1 5/2025 Rommel et al.
12,327,445 B1 6/2025 Eberhardt et al.
12,328,639 B1 6/2025 Smith et al.
12,344,168 B1 7/2025 Wang et al.
12,346,712 B1 7/2025 Eberhardt et al.
12,367,718 B1 7/2025 Calmer et al.
12,368,903 B1 7/2025 Lin et al.
12,426,007 B1 9/2025 Aguilar et al.
12,445,285 B1 10/2025 McHugh et al.
12,450,329 B1 10/2025 Torres et al.
12,479,446 B1 11/2025 Jurden et al.
12,501,178 B1 12/2025 Shemet et al.
12,511,947 B1 12/2025 Symons et al.
12,524,314 B1 1/2026 Rajadurai et al.
12,534,097 B1 1/2026 Rajvanshi et al.
12,561,624 B1 2/2026 Wang et al.
12,565,143 B1 3/2026 Dhamija et al.
2002/0061758 A1 5/2002 Zarlengo et al.
2002/0128751 A1 9/2002 Engstrom et al.
2002/0169850 A1 11/2002 Batke et al.
2003/0081935 A1 5/2003 Kirmuss
2003/0154009 A1 8/2003 Basir et al.
2004/0093264 A1 5/2004 Shimizu
2004/0236476 A1 11/2004 Chowdhary
2004/0236596 A1 11/2004 Chowdhary et al.
2005/0131585 A1 6/2005 Luskin et al.
2005/0131646 A1 6/2005 Camus

(56) References Cited

U.S. PATENT DOCUMENTS

2005/0286774 A1 12/2005 Porikli
2006/0167591 A1 7/2006 McNally
2007/0026842 A1* 2/2007 Haave .................... H04M 11/04 455/404.2
2007/0050108 A1 3/2007 Larschan et al.
2007/0173991 A1 7/2007 Tenzer et al.
2008/0252487 A1 10/2008 McClellan et al.
2008/0319602 A1 12/2008 McClellan et al.
2009/0099724 A1 4/2009 Kranz et al.
2009/0141939 A1 6/2009 Chambers et al.
2009/0240427 A1 9/2009 Siereveld et al.
2010/0030586 A1 2/2010 Taylor et al.
2010/0049639 A1 2/2010 Ferro et al.
2010/0281161 A1 11/2010 Cohn et al.
2011/0060496 A1 3/2011 Nielsen et al.
2011/0093306 A1 4/2011 Nielsen et al.
2011/0234749 A1 9/2011 Alon
2011/0276265 A1 11/2011 Husain
2012/0109418 A1 5/2012 Lorber
2012/0194357 A1 8/2012 Ciolli
2012/0201277 A1 8/2012 Tanner et al.
2012/0218416 A1 8/2012 Leny et al.
2012/0235625 A1 9/2012 Takehara
2012/0262104 A1 10/2012 Kirsch
2012/0303397 A1 11/2012 Prosser
2013/0073112 A1 3/2013 Phelan et al.
2013/0162421 A1 6/2013 Inaguma et al.
2013/0162425 A1 6/2013 Raghunathan et al.
2013/0164713 A1 6/2013 Hunt et al.
2013/0211559 A1 8/2013 Lawson et al.
2013/0244210 A1 9/2013 Nath et al.
2013/0250040 A1 9/2013 Vitsnudel et al.
2013/0332004 A1 12/2013 Gompert et al.
2014/0012492 A1 1/2014 Bowers et al.
2014/0095061 A1 4/2014 Hyde
2014/0098060 A1 4/2014 McQuade et al.
2014/0113619 A1 4/2014 Tibbitts et al.
2014/0159660 A1 6/2014 Klose et al.
2014/0195106 A1 7/2014 McQuade et al.
2014/0223090 A1 8/2014 Malone
2014/0278108 A1 9/2014 Kerrigan et al.
2014/0293069 A1 10/2014 Lazar et al.
2014/0328517 A1 11/2014 Gluncic
2014/0337429 A1 11/2014 Asenjo et al.
2014/0354227 A1 12/2014 Tyagi et al.
2014/0354228 A1 12/2014 Williams et al.
2015/0025734 A1 1/2015 Cook et al.
2015/0044641 A1 2/2015 Chauncey et al.
2015/0074091 A1 3/2015 Walkin et al.
2015/0116114 A1 4/2015 Boyles
2015/0226563 A1 8/2015 Cox et al.
2015/0283912 A1 10/2015 Shimizu et al.
2015/0347121 A1 12/2015 Harumoto
2016/0046298 A1 2/2016 DeRuyck et al.
2016/0110066 A1 4/2016 McCormick et al.
2016/0176401 A1 6/2016 Pilkington
2016/0275376 A1 9/2016 Kant
2016/0288744 A1 10/2016 Rutherford et al.
2016/0293049 A1 10/2016 Monahan et al.
2016/0343091 A1 11/2016 Han et al.
2016/0375780 A1 12/2016 Penilla et al.
2017/0039784 A1 2/2017 Gelbart et al.
2017/0060726 A1 3/2017 Glistvain
2017/0102463 A1 4/2017 Hwang
2017/0123397 A1 5/2017 Billi et al.
2017/0124476 A1 5/2017 Levinson et al.
2017/0140603 A1 5/2017 Ricci
2017/0195265 A1 7/2017 Billi et al.
2017/0200061 A1 7/2017 Julian et al.
2017/0263049 A1 9/2017 MacDonald et al.
2017/0263120 A1 9/2017 Durie, Jr. et al.
2017/0278004 A1 9/2017 McElhinney et al.
2017/0286838 A1 10/2017 Cipriani et al.
2017/0291611 A1 10/2017 Innes et al.
2017/0291800 A1 10/2017 Scoville et al.
2017/0323641 A1 11/2017 Shimizu et al.
2017/0332199 A1 11/2017 Elliott et al.
2017/0345283 A1 11/2017 Kwon et al.
2017/0366935 A1 12/2017 Ahmadzadeh et al.
2018/0001771 A1 1/2018 Park et al.
2018/0001899 A1 1/2018 Shenoy et al.
2018/0012196 A1 1/2018 Ricci et al.
2018/0025636 A1 1/2018 Boykin et al.
2018/0063576 A1 3/2018 Tillman et al.
2018/0068206 A1 3/2018 Pollach et al.
2018/0072313 A1 3/2018 Stenneth
2018/0075309 A1 3/2018 Sathyanarayana et al.
2018/0093672 A1 4/2018 Terwilliger et al.
2018/0174485 A1 6/2018 Stankoulov
2018/0234514 A1 8/2018 Rajiv et al.
2018/0247109 A1 8/2018 Joseph et al.
2018/0253109 A1 9/2018 Fontaine et al.
2018/0262724 A1 9/2018 Ross
2018/0295141 A1 10/2018 Solotorevsky
2018/0329381 A1 11/2018 Doh et al.
2018/0356800 A1 12/2018 Chao et al.
2018/0357484 A1 12/2018 Omata
2018/0364686 A1 12/2018 Naidoo et al.
2018/0365771 A1* 12/2018 Kilburn .................. G06Q 50/40
2019/0003848 A1 1/2019 Hoten et al.
2019/0007690 A1 1/2019 Varadarajan et al.
2019/0054876 A1 2/2019 Ferguson et al.
2019/0065951 A1 2/2019 Luo et al.
2019/0077308 A1 3/2019 Kashchenko
2019/0118655 A1 4/2019 Grimes et al.
2019/0120947 A1 4/2019 Wheeler et al.
2019/0174158 A1 6/2019 Herrick et al.
2019/0188847 A1 6/2019 Gonzalez et al.
2019/0235092 A1* 8/2019 Bastian, II .............. G01P 15/04
2019/0244301 A1 8/2019 Seth et al.
2019/0257661 A1 8/2019 Stentz et al.
2019/0265712 A1 8/2019 Satzoda et al.
2019/0272725 A1 9/2019 Viklund et al.
2019/0286948 A1 9/2019 Sathyanarayana et al.
2019/0303718 A1 10/2019 Tanigawa et al.
2019/0304082 A1 10/2019 Tokashiki et al.
2019/0318419 A1 10/2019 VanderZanden
2019/0318549 A1 10/2019 Zeira et al.
2019/0327590 A1 10/2019 Kubo et al.
2019/0370581 A1 12/2019 Cordell et al.
2020/0018612 A1 1/2020 Wolcott
2020/0026282 A1 1/2020 Choe et al.
2020/0050182 A1 2/2020 Cheng et al.
2020/0074326 A1 3/2020 Balakrishnan et al.
2020/0074397 A1* 3/2020 Burda ................ G06Q 10/0833
2020/0139847 A1 5/2020 Baumer et al.
2020/0162489 A1 5/2020 Bar-Nahum et al.
2020/0164509 A1 5/2020 Shults et al.
2020/0168094 A1 5/2020 Shimodaira et al.
2020/0283003 A1 9/2020 Raichelgauz
2020/0311602 A1 10/2020 Hawley et al.
2020/0312155 A1 10/2020 Kelkar et al.
2020/0327009 A1 10/2020 Callison et al.
2020/0327369 A1 10/2020 Cruz et al.
2020/0342230 A1 10/2020 Tsai et al.
2020/0342506 A1 10/2020 Levy et al.
2020/0371773 A1 11/2020 Kato et al.
2020/0380806 A1 12/2020 Tabata
2020/0389415 A1 12/2020 Zhao et al.
2021/0097315 A1 4/2021 Carruthers et al.
2021/0397908 A1 12/2021 ElHattab et al.
2022/0165073 A1 5/2022 Shikii et al.
2022/0289203 A1 9/2022 Makilya et al.
2022/0374737 A1 11/2022 Dhara et al.
2023/0077207 A1 3/2023 Hassan et al.
2023/0153735 A1 5/2023 Dhara et al.
2023/0169420 A1 6/2023 Dhara et al.
2023/0281553 A1 9/2023 Singh et al.
2024/0003749 A1 1/2024 Lin et al.
2024/0005678 A1 1/2024 Hassan et al.
2024/0013423 A1 1/2024 Zaheer et al.
2024/0063596 A1 2/2024 Pandian et al.

(56) References Cited

U.S. PATENT DOCUMENTS

2024/0146629 A1 5/2024 Lloyd
2025/0002033 A1 1/2025 Calmer et al.

FOREIGN PATENT DOCUMENTS

EP 1615178 A2 1/2006
GB 2288892 A 11/1995
WO WO 2017/123665 A1 7/2017
WO WO 2018/131322 A1 7/2018
WO WO 2019/099409 A1 5/2019
WO WO 2019/125545 A1 6/2019
WO WO 2019/133533 A1 7/2019
WO WO 2023/244513 A1 12/2023

OTHER PUBLICATIONS

"Fleet Dashcam Solution—Vision Mobile App", Fleet Complete, accessed on May 16, 2024 [publication date unknown], in 13 pages. URL: https://www.fleetcomplete.com/products/old-vision-xxxxxx/.
"Fleet Complete Vision Brings Intelligent Video Analytics to Advance Fleet Safety", Fleet Complete, Apr. 5, 2018, in 1 page. URL: https://www.fleetcomplete.com/fleet-complete-vision-brings-intelligent-video-analytics-to-advance-fleet-safety/.
"Fuelopps" [archived webpage], Propel It, archived on Nov. 14, 2017, in 3 pages. URL: https://web.archive.org/web/20171114184116/http://www.propelit.net:80/fuelopps2.
"Fuelopps", Propel It, [publication date unknown], in 1 page. (PROPEL-IT-1393_00001).
"FuelOpps ™ Delivers for Covenant Transportation Group—Improved driver behavior contributes to a 3+% MPG improvement in less than 12 months", FuelOpps by Propel IT, [publication date unknown], in 2 pages.
"FuelOpps™ Version 2.0" [presentation], Propel IT, Inc., [publication date unknown], in 17 pages.
"Our Products" [archived webpage], Propel It, archived on Aug. 3, 2018, in 2 pages. URL: https://web.archive.org/web/20180803052120/http://www.propelit.net:80/our-products-1.
"Our Products" [archived webpage], Propel It, archived on Aug. 3, 2018, in 2 pages. URL: https://web.archive.org/web/20180803052120/http://www.propelit.net:80/our-products-1 (MOTIVE-ITC-1393-0024677).
"Our Story", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0015).
"Safetyopps" [archived webpage], Propel It, archived on Nov. 14, 2017, in 3 pages. URL: https://web.archive.org/web/20171114183538/http://www.propelit.net:80/safetyopps2.
"Safetyopps", Propel It, [publication date unknown], in 1 page. (PROPEL-IT-1393_00019).
Gallagher, J., "KeepTruckin's AI Focus driving down costs for customers", FreightWaves, Dec. 9, 2019, in 4 pages. URL: https://www.freightwaves.com/news/ai-focus-vaults-keeptruckin-higher-on-freighttech-25-list.
Netradyne, Warnings, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 2 pages (ND_ITC_0005-ND_ITC_0006).
"Cargo Monitor", Samsara Inc., accessed Feb. 21, 2024 [publication date unknown], in 2 pages. URL: https://www.samsara.com/products/models/cargo-monitor.
"Connect your operations on the Samsara Platform.", Samsara Inc., [publication date unknown]. URL: https://www.samsara.com/products/platform/?gad_source=1&gclid=EAIaIQobChMI14DWlofYgwMVaymtBh36cwx9EAAYASAAEgKjUfD_BwE#impact1 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.
Driver I, The Power of Vision, Netradyne, [publication date unknown], in 2 pages.
"Driver Scorecards & Fleet Safety" [archived webpage], KeepTruckin, Inc., accessed on Oct. 24, 2023 [archived on Apr. 23, 2019; publication date unknown], in 9 pages. URL: https://web.archive.org/web/20190423104921/https://keeptruckin.com/fleet-safety-and-coaching.
"Driver Speed Management for Fleets—Monitoring Speeding in your fleet to increase safety and lower costs", Lytx, 2018, in 9 pages. URL: https://web.archive.org/web/20181217230050/https:/www.lytx.com/en-us/fleet-services/program-enhancements/speed-management-for-fleets.
"Dual-Facing AI Dash Cam—CM32", Samsara Inc., accessed Feb. 7, 2024 [publication date unknown]. URL: https://www.samsara.com/ca/products/models/cm32/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.
"Eco:Drive™ Social, the community of responsible drivers", Stellantis, Apr. 15, 2014, in 2 pages. URL: https://www.media.stellantis.com/em-en/fiat/press/eco-drive-social-the-community-of-responsible-drivers.
"EcoDrive", Wikipedia, 2022, in 1 page. URL: https://en.wikipedia.org/wiki/EcoDrive.
"ELD Fact Sheet—English Version", Federal Motor Carrier Safety Administration, U.S. Department of Transportation, last updated Oct. 31, 2017 [publication date unknown], in 3 pages. URL: https://www.fmcsa.dot.gov/hours-service/elds/eld-fact-sheet-english-version.
"EM21—Environmental Monitor", Samsara Inc., accessed Feb. 21, 2024 [publication date unknown], in 5 pages. URL: https://www.samsara.com/uk/products/models/em21/.
"Fast Facts: Electronic Logging Device (ELD) Rule", Federal Motor Carrier Safety Administration, U.S. Department of Transportation, Jun. 2017, Document No. FMCSA-ADO-17-003 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.
"Fiat 500—2015 Owner's Manual", FCA US LLC, 2016, 5th ed., in 440 pages.
"Fiat 500 Eco system", Fiat 500 Eco System Forum, Apr. 21, 2020, in 5 pages. URL: https://www.fiat500usaforum.com/forum/fiat-500-forums/fiat-500-general-discussion/32268-fiat-500-eco-system?36406-Fiat-500-Eco-system=.
"Fiat launches EcoDrive for 500 and Grande Punto", Indian Autos Blog, Jul. 10, 2008, in 4 pages. URL: https://indianautosblog.com/fiat-launches-ecodrive-for-500-and-grande-punto-p3049.
"Fiat launches fleet-specific eco: Drive system", Fleet World, 2010, in 3 pages. URL: https://fleetworld.co.uk/fiat-launches-fleet-specific-ecodrive-system/.
Goodwin, A., "Fiats ecoDrive teaches efficient driving", CNET, Oct. 22, 2008, in 5 pages. URL: https://www.cnet.com/roadshow/news/fiats-ecodrive-teaches-efficient-driving/.
"Front-Facing AI Dash Cam—CM31", Samsara Inc., accessed Feb. 7, 2024 [publication date unknown]. URL: https://www.samsara.com/products/models/cm31/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.
"Guide: DRIVE risk score 101", Motive Technologies, Inc., [publication date unknown], Document No. 2022Q2_849898994 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 22 pages.
"Introduction Pack", Drivecam, Inc., 2012, in 32 pages. URL: https://www.iae-services.com.au/downloads/DriveCam-Introduction-Pack.pdf.

(56) References Cited

OTHER PUBLICATIONS

"KeepTruckin Expands Hardware Portfolio to Support Fleet Safety and Efficiency—New dual-facing dash camera and asset tracker deliver fleet safety and asset visibility", Business Wire, Sep. 9, 2019, in 4 pages. URL: https://www.businesswire.com/news/home/20190909005517/en/KeepTruckin-Expands-Hardware-Portfolio-to-Support-Fleet-Safety-and-Efficiency.
"KeepTruckin Launches New AI Dashcam Featuring Industry-Leading Accuracy to Proactively Prevent Accidents, Increase Safety and Efficiency", Business Wire, Aug. 12, 2021. URL: https://www.businesswire.com/news/home/20210812005612/en/KeepTruckin-Launches-New-AI-Dashcam-Featuring-Industry-Leading-Accuracy-to-Proactively-Prevent-Accidents-Increase-Safety-and-Efficiency (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.
"Lytx DriveCam Program Adds New Client-Centric Enhancements", Mass Transit, Oct. 4, 2016, in 6 pages. URL: https://www.masstransitmag.com/safety-security/press-release/12265105/lytx-lytx-drivecamtm-program-adds-newclient-centric-enhancements-evolving-the-gold-standard-video-telematics-program.
"Lytx Video Services Workspace—Screenshot Key", Lytx, 2017, in 1 page. URL: https://www.multivu.com/players/English/7899252-lytx-video-services-program/docs/KeytoLytx_1505780254680-149005849.pdf.
"Making roads safer for everyone, everywhere", Light Metrics, 2023, in 8 pages. URL: https://www.lightmetrics.co/about-us.
"Map and Tile Coordinates", Google for Developers, last updated Oct. 23, 2023 [retrieved on Oct. 24, 2023], in 5 pages. URL: https://developers.google.com/maps/documentation/javascript/coordinates.
"Meet Return on Traffic Data—The new potential for contextualized transportation analytics", Geotab ITS, accessed on Apr. 1, 2024 [publication date unknown], in 13 pages. URL: https://its.geotab.com/return-on-traffic-data/.
"Mobile Logbook for Drivers" [archived webpage], KeepTruckin, Inc., accessed on Feb. 5, 2024 [archived on Dec. 13, 2013; publication date unknown]. URL: https://web.archive.org/web/20131213071205/https:/keeptruckin.com/(filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.
"Motive Announces AI Omnicam, the Industry's First AI-Enabled Camera Built for Side, Rear, Passenger, and Cargo Monitoring", Business Wire, Jun. 15, 2023, in 2 pages. URL: https://www.businesswire.com/news/home/20230615577887/en/Motive-Announces-AI-Omnicam-the-Industry%E2%80%99s-First-AI-Enabled-Camera-Built-for-Side-Rear-Passenger-and-Cargo-Monitoring.
"Nauto—Getting Started", Manualslib, Nauto, Inc., Apr. 20, 2017, in 18 pages. URL: https://www.manualslib.com/manual/1547723/Nauto-Nauto.html.
"Netradyne Adds New Detection Features to Driveri Platform", Automotive Fleet Magazine, Oct. 27, 2016, in 13 pages. URL: https://www.automotive-fleet.com/137445/netradyne-adds-new-detection-features-to-driveri-platform.
"NetraDyne Discuss their AI Platform 5G and their vision of the IoT (Internet of Things)", GSMA, Oct. 3, 2018, in 2 pages. URL: https://www.gsma.com/solutions-and-impact/technologies/internet-of-things/news/netradyne-interview/.
"Netradyne Vision based driver safety solution—Model Name: Driver I, Model No. DRI-128-TMO" [device specification], [publication date unknown], in 4 pages. URL: https://device.report/m/4dd89450078fa688b333692844d3bde954ddfbaf5c105c9d1d42dfd6965cbf1b.pdf.
"NetraDyne, an Artificial Intelligence Leader, Launches Driver-i™, a Vision-Based Platform, Focusing on Commercial Vehicle Driver Safety", Netradyne, [publication date unknown], in 2 pages.
"NetraDyne's Artificial Intelligence Platform Improves Road Safety", Sierra Wireless, Oct. 31, 2016, in 4 pages. URL: https://device.report/m/7d898f1b967fc646a1242d092207719be5da8c6cc9c7daabc63d4a307cfd3dcb.pdf.
"Product Brief: System Overview", Motive Technologies, Inc., [publication date unknown], Document No. 2022Q4_1203118185166511 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.
"Product Brief: System Overview", Motive Technologies, Inc., [publication date unknown], Document No. 2022Q4_1203118185166511 (referenced in Jan. 24, 2024 Complaint, Case No. 1:24-cv-00084-UNA), in 3 pages. URL: https://gomotive.com/content-library/guides/system-overview/.
"Real-Time GPS Fleet Tracking" [archived webpage], KeepTruckin, Inc., accessed on Oct. 24, 2023 [archived on Apr. 8, 2019; publication date unknown], in 4 pages. URL: https://web.archive.org/web/20190408022059/https:/keeptruckin.com/gps-tracking.
"Samsara Vehicle Telematics—Fleet Technology That Goes Beyond GPS Tracking", Fleet Europe, Nexus Communication S.A., Oct. 11, 2022, in 7 pages. URL: https://www.fleeteurope.com/en/connected/europe/features/samsara-vehicle-telematics-fleet-technology-goes-beyond-gps-tracking?t%5B0%5D=Samsara&t%5B1%5D=Telematics&t%5B2%5D=Connectivity&curl=1.
"Sensor Fusion: Building the Bigger Picture of Risk", Lytx, Apr. 12, 2019, in 1 page. URL: https://www.lytx.com/newsletter/sensor-fusion-building-the-bigger-picture-of-risk.
"Smart Dashcam" [archived webpage], KeepTruckin, Inc., accessed on Oct. 24, 2023 [archived on Apr. 8, 2019; publication date unknown], in 8 pages. URL: https://web.archive.org/web/20190408015958/https://keeptruckin.com/dashcam.
"Spec Sheet: AI Dashcam", Motive Technologies, Inc., [publication date unknown], Document No. 2023Q2_1204527643716537 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.
"Spec Sheet: AI Dashcam", Motive Technologies, Inc., [publication date unknown], Document No. 2023Q2_1205736073289732 (referenced in Jan. 24, 2024 Complaint, Case No. 1:24-cv-00084-UNA), in 5 pages. URL: https://gomotive.com/content-library/spec-sheet/ai-dashcam/.
"Spec Sheet: AI Omnicam", Motive Technologies, Inc., [publication date unknown], Document No. 2023Q2_ 1204519709838862 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.
"Spec Sheet: Smart Dashcam", Motive Technologies, Inc., [publication date unknown], Document No. 2022Q2_911703417 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 4 pages.
"Spec Sheet: Vehicle Gateway", Motive Technologies, Inc., [publication date unknown], Document No. 2022Q1_858791278 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 6 pages.
"Spec Sheet: Vehicle Gateway", Motive Technologies, Inc., [publication date unknown], Document No. 2022Q1_858791278 (referenced in Jan. 24, 2024 Complaint, Case No. 1:24-cv-00084-UNA), in 6 pages. URL: https://gomotive.com/content-library/spec-sheet/vehicle-gateway/.
"The 2012 Fiat 500: eco:Drive", Fiat500USA.com, Feb. 14, 2011, in 24 pages. URL: http://www.fiat500usa.com/2011/02/2012-fiat-500-ecodrive.html.
"The World's Smartest 360° Dashcam: Vezo 360—Fast Facts", Arvizon, [publication date unknown], in 7 pages. URL: https://cdn.newswire.com/files/x/5e/13/b92cd7c6259a708e1dfdaa0123c4.pdf.

(56) References Cited

OTHER PUBLICATIONS

"What is a ter-a-flop?", netradyne.com, [publication date unknown], in 2 pages.
"Vehicle Gateway", Samsara Inc., [publication date unknown]. URL: https://www.samsara.com/products/models/vehicle-gateway (filed with 2024-02-08 ITC Complaint, In the Matter of Certain Vehicle Telematics, Fleet Management, and Video-Based Safety Systems, Devices, and Components thereof, Investigation No. 337-TA-1393), in 5 pages.
"Vezo 360 Dash Cam—Capture Every Single Angle in Crisp Detail", ArVizon, 2019, in 13 pages. URL: https://www.arvizon.com/vezo-360-dash-cam/.
"Vezo 360, the World's Smartest Dashcam, Keeps You Awake at the Wheel", PR Newswire, Apr. 2, 2019, in 4 pages. URL: https://www.prnewswire.com/news-releases/vezo-360-the-worlds-smartest-dashcam-keeps-you-awake-at-the-wheel-300823457.html.
"The Home of Actionable Transportation Insights—Meet Altitude", Geotab ITS, accessed on Apr. 1, 2024 [publication date unknown], in 5 pages. URL: https://its.geotab.com/altitude/.
"Transform your business with the Connected Operations™ Cloud", Samsara Inc., accessed Feb. 21, 2024 [publication date unknown], in 8 pages. URL: https://www.samsara.com/products/platform/#impact0.
24/7 Staff, "KeepTruckin Raises $18 Million as Silicon Valley Eyes Trucking Industry", Supply Chain 24/7, May 23, 2017. URL: https://www.supplychain247.com/article/keeptruckin_raises_18_million_as_silicon_valley_eyes_trucking_industry/CSA (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 1 page.
Alpert, B., "Deep Learning for Distracted Driving Detection", Nauto, Jan. 15, 2019, in 10 pages. URL: https://www.nauto.com/blog/nauto-engineering-deep-learning-for-distracted-driver-monitoring.
Amazon Web Services, "How Nauto Is Using AI & MI to Build a Data Platform That Makes Driving Safer and Fleets Smarter" [video], YouTube, Apr. 16, 2018, screenshot in 1 page. URL: https://www.youtube.com/watch?v=UtMIrYTmCMU.
Armstrong, C. et al. "Transport Canada Commercial Bus HVEDR Feasibility Study (File No. T8080-160062) Deliverable No. 4", Mecanica Scientific Services Corp, 2018, in 62 pages. URL: https://transcanadahvedr.ca/wp-content/uploads/2022/01/T8080_Deliverable4-DevSmryRpt-FINAL-20180804_English.pdf.
Automototv, "Fiat ecoDrive System" [video], YouTube, Oct. 6, 2008, screenshot in 1 page URL: https://www.youtube.com/watch?v=AUSb2dBBI8E.
Batchelor, B. et al., "Vision Systems on the Internet", Proc. SPIE 6000, Two- and Three-Dimensional Methods for Inspection and Metrology III, Nov. 2005, vol. 600003, in 15 pages.
Bendix Commercial Vehicle Systems LLC, "Bendix launches new Wingman Fusion safety system at Mid-America Trucking Show", OEM Off-Highway, Mar. 25, 2015, in 10 pages. URL: https://www.oemoffhighway.com/electronics/sensors/proximity-detection-safety-systems/press-release/12058015/bendix-launches-new-wingman-fusion-safety-system-at-midamerica-trucking-show.
Bendix, "Bendix® Wingman® Fusion: The Integration of camera, radar, and brakes delivers a new level of performance in North America", Waterstruck.com, 2015, in 10 pages. URL: https://www.waterstruck.com/assets/Bendix-Wingman-Fusion-brochure_Truck-1.pdf.
Bendix, "Quick Reference Catalog", Bendix Commercial Vehicle Systems LLC, 2018, in 165 pages. URL: https://www.bendix.com/media/home/bw1114_us_010.pdf [uploaded in 2 parts].
Bergasa, L. M et al., "DriveSafe: an App for Alerting Inattentive Drivers and Scoring Driving Behaviors", IEEE Intelligent Vehicles Symposium (IV), Jun. 2014, in 7 pages.
Boodlal, L. et al., "Study of the Impact of a Telematics System on Safe and Fuel-efficient Driving in Trucks", U.S. Department of Transportation, Federal Motor Carrier Safety Administration, Apr. 2014, Report No. FMCSA-13-020, in 54 pages.
Brown, P. et al., "AI Dash Cam Benchmarking" [report], Strategy Analytics, Inc., Apr. 15, 2022, in 27 pages.
Camden, M et al., "AI Dash Cam Performance Benchmark Testing Final Report", Virginia Tech Transportation Institute, revised Aug. 17, 2023 [submitted Jun. 30, 2023] (filed with Jan. 24, 2024 Complaint, Case No. 1:24-cv-00084-UNA), in 110 pages.
Camden, M. et al., "AI Dash Cam Performance Benchmark Testing Final Report", Virginia Tech Transportation Institute, submitted Jun. 30, 2023 (filed with Jan. 24, 2024 Complaint, Case No. 1:24-cv-00084-UNA), in 109 pages.
Camillo, J., "Machine Vision for Medical Device Assembly", Assembly, Mar. 3, 2015, in 5 pages. URL: https://www.assemblymag.com/articles/92730-machine-vision-for-medical-device-assembly.
Camillo, J., "Machine Vision for Medical Device Assembly", Assembly, Mar. 3, 2015, in 5 pages.
Cetecom, "FCC/IC Test Setup Photos, Intelligent Driving Monitoring System Smart Connected Dash Cam", Cetecom, Inc., Feb. 7, 2018, in 9 pages. URL: https://device.report/m/a68e1abef29f58b699489f50a4d27b81f1726ab4f55b3ac98b573a286594dc54.pdf.
Chauhan, V. et al., "A Comparative Study of Machine Vision Based Methods for Fault Detection in an Automated Assembly Machine", Procedia Manufacturing, 2015, vol. 1, pp. 416-428.
Chiou, R. et al., "Manufacturing E-Quality Through Integrated Web-enabled Computer Vision and Robotics", The International Journal of Advanced Manufacturing Technology, Aug. 2009, vol. 43, in 19 pages.
Chiou, R. et al., "Manufacturing E-Quality Through Integrated Web-enabled Computer Vision and Robotics", The International Journal of Advanced Manufacturing Technology, 2009 (published online Oct. 1, 2008), vol. 43, in 11 pages.
Cook, B., "Drivecam: Taking Risk out of Driving, Findings related to In-Cab driver Distraction", Drivecam, 2010, in 50 pages. URL: https://www.fmcsa.dot.gov/sites/fmcsa.dot.gov/files/docs/MCSAC_201006_DriveCam.pdf.
Cordes, C., "Ask an Expert: Capturing Fleet Impact from Telematics", McKinsey & Co., Jun. 13, 2017, in 3 pages. URL: https://www.mckinsey.com/capabilities/operations/our-insights/ask-an-expert-capturing-fleet-impact-from-telematics.
D'Agostino, C. et al., "Learning-Based Driving Events Recognition and Its Application to Digital Roads", IEEE Transactions on Intelligent Transportation Systems, Aug. 2015, vol. 16(4), pp. 2155-2166.
Dillon, A., "User Interface Design", MacMillan Encyclopedia of Cognitive Science, 2003, vol. 4, London: MacMillan, in 18 pages (pp. 453-458). Downloaded from http://hdl.handle.net/10150/105299.
Dillon, A., "User Interface Design", *MacMillan Encyclopedia of Cognitive Science,* 2006, vol. 4, London: MacMillan, in 6 pages (pp. 453-458). Downloaded from https://onlinelibrary.wiley.com/doi/10.1002/0470018860.s00054.
Dunn, B., "What is the Lytx DriveCam?", Autobytel, Jul. 12, 2014, in 1 page. URL: https://www.autobytel.com/what-is-lytx-drivecam.
Ekström, L., "Estimating fuel consumption using regression and machine learning", KTH Royal Institute of Technology, Degree Project in Mathematics, 2018, in 126 pages.
Engelbrecht, J. et al., "A Survey of Smartphone-based Sensing in Vehicles for ITS Applications", IET Intelligent Transport Systems, Jul. 2015, vol. 9(10), in 23 pages.
Fiat, "Interview to Giorgio Neri: videotutorial eco:Drive" [video], YouTube, Dec. 1, 2010, screenshot in 1 page. URL: https://www.youtube.com/watch?v=XRDeHbUimOs&t=27s.
FiatFranco, ""Ciao!"—Fiat ecoDrive" [video], YouTube, Sep. 10, 2007, screenshot in 1 page URL: https://www.youtube.com/watch?v=SluE9Zco55c.
Firstnet™ Built with AT&T, "Reliable telematics solution for utility fleets", Fleet Complete, Apr. 25, 2019, in 2 pages. URL: https://www.firstnet.com/content/dam/firstnet/white-papers/firstnet-fleet-complete-utilities.pdf.

(56) References Cited

OTHER PUBLICATIONS

Fleet Complete, "Tony Lourakis tests out Fleet Complete Vision—our new video telematics and driver coaching tool" [video], YouTube, Jan. 9, 2019, screenshot in 1 page. URL: https://www.youtube.com/watch?v=3zEY5x5DOY8.
Fleet Equipment Staff, "Lytx announces enhancements to DriveCam system", Fleetequipmentmag.com, Oct. 7, 2016, in 9 pages. URL: https://www.fleetequipmentmag.com/lytx-drivecam-system-truck-telematics/.
Geraci, B., "It's been one year since we launched the Motive AI Dashcam. See how it's only gotten better.", Motive Technologies, Inc., Oct. 13, 2022, in 5 pages. URL: https://gomotive.com/blog/motive-ai-dashcam-year-one/.
Gilman, E. et al., "Personalised assistance for fuel-efficient driving", Transportation Research Part C, Mar. 2015, pp. 681-705.
Ginevra2008, "Fiat EcoDrive" [video], YouTube, Mar. 7, 2008, screenshot in 1 page. URL: https://www.youtube.com/watch?v=D95p9Bljr90.
Goncalves, J. et al., "Smartphone Sensor Platform to Study Traffic Conditions and Assess Driving Performance", 17th International IEEE Conference on Intelligent Transportation Systems (ITSC), Oct. 2014, in 6 pages.
Green, A., "Logistics Disruptors: Motive's Shoaib Makani on AI and automation", McKinsey & Company, Sep. 6, 2022, in 7 pages. URL: https://www.mckinsey.com/industries/travel-logistics-and-infrastructure/our-insights/logistics-disruptors-motives-shoaib-makani-on-ai-and-automation.
Groover, M. P., Automation, Production Systems, and Computer-Integrated Manufacturing, 2015, 4th Edition, Pearson, in 811 pages.
Groover, M. P., *Automation, Production Systems, and Computer-Integrated Manufacturing,* 2016, 4th Edition (Indian Subcontinent Adaptation), Pearson, in 11 pages.
Hampstead, J. P. "Lightmetrics:an exciting video telematics software startup", FrieghtWaves, Aug. 5, 2018, in 4 pages. URL: https://www.freightwaves.com/news/lightmetrics-exciting-video-telematics-startup.
Han, Z. et al., "Design of Intelligent Road Recognition and Warning System for Vehicles Based on Binocular Vision", IEEE Access, Oct. 2018, vol. 6, pp. 62880-62889.
Hanson, Kelly, "Introducing Motive's Safety Hub for accident prevention and exoneration.", Motive Technologies, Inc., Aug. 18, 2020, in 6 pages. URL: https://gomotive.com/blog/motive-safety-hub/.
Haridas, S., "KeepTruckin Asset Gateway Review", Truck Trailer Tracker, Nov. 16, 2020, in 7 pages. URL: https://trucktrailertracker.com/keeptruckin-asset-gateway-review/.
Haworth, N. et al., "The Relationship between Fuel Economy and Safety Outcomes", Monash University, Accident Research Centre, Dec. 2001, Report No. 188, in 67 pages.
Horowitz, E. "Improve Fleet Safety with Samsara", Samsara Inc., Aug. 25, 2017, in 4 pages. URL: https://www.samsara.com/ca/blog/improve-fleet-safety-with-samsara/.
Horsey, J., "VEZO 360 4K 360 dash cam from $149", Geeky Gadgets, Apr. 3, 2019, in 12 pages. URL: https://www.geeky-gadgets.com/vezo-360-4k-360-dash-cam-03-04-2019/.
Huang, K.-Y. et al., "A Novel Machine Vision System for the Inspection of Micro-Spray Nozzle", Sensors, Jun. 2015, vol. 15(7), pp. 15326-15338.
Huff, A., "Lytx DriveCam", CCJDigital, Apr. 4, 2014, in 12 pages. URL: https://www.ccjdigital.com/business/article/14929274/lytx-drivecam.
Huff, A., "NetraDyne Uses Artificial Intelligence in New Driver Safety Platform", CCJ, Sep. 15, 2016, in 10 pages. URL: https://www.ccjdigital.com/business/article/14933761/netradyne-uses-artificial-intelligence-in-new-driver-safety-platform.
Junior, J. F. et al., "Driver behavior profiling: An investigation with different smartphone sensors and machine learning", PLoS ONE, Apr. 2017, vol. 12(4): e0174959, in 16 pages.
Khan, M., "Why and How We Measure Driver Performance", Medium, Jan. 14, 2020. URL: https://medium.com/motive-eng/why-and-how-we-measure-driver-performance-768d5316fb2c#:~:text=By%20studying%20data%20gathered%20from,the%20driver%20a%20safety%20score (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 8 pages.
Kinney, J., "Timeline of the ELD Mandate: History & Important Dates", GPS Trackit, May 3, 2017. URL: https://gpstrackit.com/blog/a-timeline-of-the-eld-mandate-history-and-important-dates/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.
Kwon, Y. J. et al., "Automated Vision Inspection in Network-Based Production Environment", International Journal of Advanced Manufacturing Technology, Feb. 2009, vol. 45, pp. 81-90.
Lan, M. et al., "SmartLDWS: A Robust and Scalable Lane Departure Warning System for the Smartphones", Proceedings of the 12th International IEEE Conference on Intelligent Transportation Systems, Oct. 3-7, 2009, pp. 108-113.
Lekach, S., "Driver safety is 'all talk' with this AI real-time road coach", Mashable, Aug. 3, 2018, in 11 pages. URL: https://mashable.com/article/netradyne-driveri-ai-driver-safety.
Lotan, T. et al., "In-Vehicle Data Recorder for Evaluation of Driving Behavior and Safety", Transportation Research Record Journal of the Transportation Research Board, Jan. 2006, in 15 pages.
Lytx, "TeenSafe Driver Program", American Family Insurance®, 2014, in 10 pages. URL: https://online-sd02.drivecam.com/Downloads/TSD_WebsiteGuide.pdf.
Malamas, Elias N. et al. "A survey on industrial vision systems, applications and tools", Image and Vision Computing, Dec. 28, 2002, vol. 21, pp. 171-188.
Meiring, G. et al., "A Review of Intelligent Driving Style Analysis Systems and Related Artificial Intelligence Algorithms", Sensors, Dec. 2015, vol. 15, pp. 30653-30682.
Mitrovic, D. et al., "Reliable Method for Driving Events Recognition", IEEE Transactions on Intelligent Transportation Systems, Jun. 2005, vol. 6(2), pp. 198-205.
Motive Help Center, "*New Fleet Managers Start Here*—Getting Started with Motive for Fleet Managers", Motive Technologies, Inc., accessed on Oct. 24, 2023 [publication date unknown], in 2 pages. URL: https://helpcenter.gomotive.com/hc/en-US/articles/6162442580893--New-Fleet-Managers-Start-Here-Getting-Started-with-Motive-for-Fleet-Managers.
Motive Help Center, "How to add a vehicle on the Fleet Dashboard", Motive Technologies, Inc., accessed on Oct. 25, 2023 [publication date unknown], in 6 pages. URL: https://helpcenter.gomotive.com/hc/en-us/articles/6208623928349.
Motive Help Center, "How to assign an Environmental Sensor to Asset Gateway", Motive Technologies, Inc., accessed on Oct. 24, 2023 [publication date unknown], in 11 pages. URL: https://helpcenter.gomotive.com/hc/en-us/articles/6908982681629.
Motive Help Center, "How to create a Geofence", Motive Technologies, Inc., accessed on Oct. 24, 2023 [publication date unknown], in 5 pages. URL: https://helpcenter.gomotive.com/hc/en-us/articles/6162211436061-How-to-create-a-Geofence.
Motive Help Center, "How to create Alert for Geofence", Motive Technologies, Inc., accessed on Oct. 24, 2023 [publication date unknown], in 10 pages. URL: https://helpcenter.gomotive.com/hc/en-us/articles/6190688664733-How-to-create-Alert-for-Geofence.
Motive Help Center, "How to enable Dashcam In-cab Alerts for a Vehicle?", Motive Technologies, Inc., accessed on Feb. 7, 2024 [publication date unknown]. URL: https://helpcenter.gomotive.com/hc/en-us/articles/11761978874141-How-to-enable-Dashcam-In-cab-Alerts-for-a-Vehicle (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.
Motive Help Center, "How to enable Event Severity", Motive Technologies, Inc., accessed on Oct. 24, 2023 [publication date unknown], in 3 pages. URL: https://helpcenter.gomotive.com/hc/en-us/articles/7123375017757-How-to-enable-Event-Severity.

(56) References Cited

OTHER PUBLICATIONS

Motive Help Center, "How to enable In-Cab audio alerts on the Motive Fleet Dashboard", Motive Technologies, Inc., accessed on Oct. 25, 2023 [publication date unknown], in 4 pages. URL: https://helpcenter.gomotive.com/hc/en-us/articles/6176882285469.
Motive Help Center, "How to install Environmental Sensors", Motive Technologies, Inc., accessed on Oct. 24, 2023 [publication date unknown], in 4 pages. URL: https://helpcenter.gomotive.com/hc/en-us/articles/6907777171613.
Motive Help Center, "How to Manage a Group and Sub-groups", Motive Technologies, Inc., accessed on Oct. 24, 2023 [publication date unknown], in 4 pages. URL: https://helpcenter.gomotive.com/hc/en-us/articles/6189047187997-How-to-Manage-A-Group-and-Sub-groups.
Motive Help Center, "How to manage Fuel Hub Vehicle Details", Motive Technologies, Inc., accessed on Oct. 24, 2023 [publication date unknown], in 5 pages. URL: https://helpcenter.gomotive.com/hc/en-us/articles/6190039573789-How-to-manage-Fuel-Hub-Vehicle-Details.
Motive Help Center, "How to modify/ set up custom safety events thresholds", Motive Technologies, Inc., accessed on Oct. 24, 2023 [publication date unknown], in 4 pages. URL: https://helpcenter.gomotive.com/hc/en-us/articles/6162556676381-How-to-set-up-Custom-Safety-Event-Thresholds-for-vehicles.
Motive Help Center, "How to monitor Fleet's Speeding behavior", Motive Technologies, Inc., accessed on Oct. 24, 2023 [publication date unknown], in 4 pages. URL: https://helpcenter.gomotive.com/hc/en-us/articles/6189068876701-How-to-monitor-fleet-s-Speeding-behavior.
Motive Help Center, "How to recall/request video from the Motive Fleet Dashboard?", Motive Technologies, Inc., accessed on Oct. 25, 2023 [publication date unknown], in 7 pages. URL: https://helpcenter.gomotive.com/hc/en-us/articles/6162075219229-How-to-recall-request-video-from-the-Motive-Dashcam.
Motive Help Center, "How to record Hours of Service (HOS) with Vehicle Gateway", Motive Technologies, Inc., accessed on Oct. 24, 2023 [publication date unknown], in 3 pages. URL: https://helpcenter.gomotive.com/hc/en-us/articles/6162505072157-How-to-record-Hours-of-Service-HOS-with-Vehicle-Gateway.
Motive Help Center, "How to set a custom Speed Limit", Motive Technologies, Inc., accessed on Oct. 24, 2023 [publication date unknown], in 5 pages. URL: https://helpcenter.gomotive.com/hc/en-us/articles/8866852210205-How-to-set-a-custom-Speed-Limit.
Motive Help Center, "How to Set Real-Time Speeding Alerts on the Fleet Dashboard", Motive Technologies, Inc., accessed on Oct. 24, 2023 [publication date unknown], in 7 pages. URL: https://helpcenter.gomotive.com/hc/en-us/articles/6175738246557-How-to-Set-Real-Time-Speeding-Alerts-on-the-Fleet-Dashboard.
Motive Help Center, "How to set up Custom Safety Event Thresholds for vehicles", Motive Technologies, Inc., accessed on Mar. 13, 2023 [publication date unknown], in 6 pages. URL: https://helpcenter.gomotive.com/hc/en-us/articles/6162556676381-How-to-set-up-Custom-Safety-Event-Thresholds-for-vehicles.
Motive Help Center, "How to track vehicle speed from the Motive Fleet Dashboard", Motive Technologies, Inc., accessed on Oct. 24, 2023 [publication date unknown], in 4 pages. URL: https://helpcenter.gomotive.com/hc/en-us/articles/6189043119261-How-to-track-vehicle-speed-from-the-Motive-Fleet-Dashboard.
Motive Help Center, "How to unpair and repair Environmental Sensors", Motive Technologies, Inc., accessed on Oct. 24, 2023 [publication date unknown], in 3 pages. URL: https://helpcenter.gomotive.com/hc/en-us/articles/6905963506205-How-to-unpair-and-repair-Environmental-Sensors.
Motive Help Center, "How to view a Safety Event", Motive Technologies, Inc., accessed on Oct. 25, 2023 [publication date unknown], in 4 pages. URL: https://helpcenter.gomotive.com/hc/en-us/articles/6189410468509-How-to-view-a-Safety-Event.
Motive Help Center, "How to view Fleet DRIVE Score Report on Fleet Dashboard", Motive Technologies, Inc., accessed on Feb. 7, 2024 [publication date unknown]. URL: https://helpcenter.gomotive.com/hc/en-us/articles/13200798670493-How-to-view-Fleet-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.
Motive Help Center, "How to view Fuel Hub Driver Details", Motive Technologies, Inc., [publication date unknown]. URL: https://helpcenter.gomotive.com/hc/en-us/articles/6173246145053-How-to-view-Fuel-Hub-Driver-Details (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.
Motive Help Center, "How to view Fuel Hub Driver Details", Motive Technologies, Inc., accessed on Oct. 24, 2023 [publication date unknown], in 7 pages. URL: https://helpcenter.gomotive.com/hc/en-us/articles/6173246145053-How-to-view-Fuel-Hub-Driver-Details.
Motive Help Center, "How to view Group DRIVE Score Report on Fleet Dashboard", Motive Technologies, Inc., accessed on Feb. 7, 2024 [publication date unknown]. URL: https://helpcenter.gomotive.com/hc/en-us/articles/12743858622365-How-to-view-Group-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.
Motive Help Center, "How to view safety events report", Motive Technologies, Inc., accessed on Oct. 24, 2023 [publication date unknown], in 2 pages. URL: https://helpcenter.gomotive.com/hc/en-us/articles/6190647741853-How-to-view-safety-events-report.
Motive Help Center, "How to view Stop Sign Violation events on Fleet Dashboard", Motive Technologies, Inc., accessed on Feb. 7, 2024 [publication date unknown]. URL: https://helpcenter.gomotive.com/hc/en-us/articles/6163732277917-How-to-view-Stop-Sign-Violation-events-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.
Motive Help Center, "How to view Stop Sign Violation events on Fleet Dashboard", Motive Technologies, Inc., accessed on Oct. 24, 2023 [publication date unknown], in 2 pages. URL: https://helpcenter.gomotive.com/hc/en-us/articles/6163732277917-How-to-view-Stop-Sign-Violation-events-on-Fleet-Dashboard.
Motive Help Center, "How to view the Driver DRIVE Score Report", Motive Technologies, Inc., accessed on Feb. 7, 2024 [publication date unknown]. URL: https://helpcenter.gomotive.com/hc/en-us/articles/13200710733853-How-to-view-the-Driver-DRIVE-Score-Report (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.
Motive Help Center, "How to view the Safety Hub and DRIVE Score details in the DriverApp", Motive Technologies, Inc., accessed on Oct. 24, 2023 [publication date unknown], in 5 pages. URL: https://helpcenter.gomotive.com/hc/en-us/articles/6162215453853-How-to-view-safety-events-and-Dashcam-videos-on-Motive-App.
Motive Help Center, "How to view your vehicle's Utilization details", Motive Technologies, Inc., accessed on Feb. 7, 2024 [publication date unknown]. URL: https://helpcenter.gomotive.com/hc/en-us/articles/6176914537373-How-to-view-your-vehicle-s-Utilization-details (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.
Motive Help Center, "Viewing Close Following Events on the Motive Fleet Dashboard", Motive Technologies, Inc., accessed on Oct. 24, 2023 [publication date unknown], in 7 pages. URL: https://helpcenter.gomotive.com/hc/en-us/articles/6189574616989-Viewing-Close-Following-Events-on-the-Motive-Fleet-Dashboard.
Motive Help Center, "What are Alert Types?", Motive Technologies, Inc., accessed on Oct. 24, 2023 [publication date unknown], in 3 pages. URL: https://helpcenter.gomotive.com/hc/en-us/articles/8239240188957-What-are-Alert-Types-.

(56) References Cited

OTHER PUBLICATIONS

Motive Help Center, "What are Environmental Sensors?", Motive Technologies, Inc., accessed on Oct. 24, 2023 [publication date unknown], in 4 pages. URL: https://helpcenter.gomotive.com/hc/en-us/articles/6907551525661-What-are-Environmental-Sensors-.
Motive Help Center, "What are safety risk tags?", Motive Technologies, Inc., accessed on Feb. 21, 2024 [publication date unknown], in 4 pages. URL: https://helpcenter.gomotive.com/hc/en-us/articles/6163713841053.
Motive Help Center, "What are the definitions of safety behaviors triggered by Motive's AI & Smart Dashcams", Motive Technologies, Inc., accessed on Mar. 13, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.
Motive Help Center, "What are the definitions of safety behaviors triggered by Motive's AI & Smart Dashcams", Motive Technologies, Inc., accessed on Oct. 24, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.
Motive Help Center, "What are unsafe behaviors?", Motive Technologies, Inc., accessed on Mar. 13, 2023 [publication date unknown], in 4 pages. URL (archived version): https://web.archive.org/web/20230203093145/https://helpcenter.gomotive.com/hc/en-us/articles/6858636962333-What-are-unsafe-behaviors-.
Motive Help Center, "What are Vehicle Gateway Malfunctions and Data Diagnostics", Motive Technologies, Inc., accessed on Oct. 24, 2023 [publication date unknown], in 4 pages. URL: https://helpcenter.gomotive.com/hc/en-us/articles/6160848958109-What-are-Vehicle-Gateway-Malfunctions-and-Data-Diagnostics.
Motive Help Center, "What is DRIVE Risk Score?", Motive Technologies, Inc., accessed on Oct. 24, 2023 [publication date unknown], in 5 pages. URL: https://helpcenter.gomotive.com/hc/en-us/articles/6162164321693-What-is-DRIVE-risk-score-.
Motive Help Center, "What is DRIVE Risk Score?", Motive Technologies, Inc., accessed on Oct. 24, 2023 [publication date unknown]. URL: https://helpcenter.gomotive.com/hc/en-us/articles/6162164321693-What-is-DRIVE-risk-score- (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.
Motive Help Center, "What is Event Severity?", Motive Technologies, Inc., accessed on Oct. 24, 2023 [publication date unknown], in 3 pages. URL: https://helpcenter.gomotive.com/hc/en-us/articles/6176003080861-What-is-Event-Severity-.
Motive Help Center, "What is Fuel Hub?", Motive Technologies, Inc., accessed on Feb. 5, 2024 [publication date unknown]. URL: https://helpcenter.gomotive.com/hc/en-us/articles/6161577899165-What-is-Fuel-Hub (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 9 pages.
Motive Help Center, "What is Fuel Hub?", Motive Technologies, Inc., accessed on Oct. 24, 2023 [publication date unknown], in 9 pages. URL: https://helpcenter.gomotive.com/hc/en-us/articles/6161577899165-What-is-Fuel-Hub-.
Motive Help Center, "What is Motive Fleet App?", Motive Technologies, Inc., accessed on Oct. 24, 2023 [publication date unknown], in 12 pages. URL: https://helpcenter.gomotive.com/hc/en-us/articles/6113996661917-What-is-Motive-Fleet-App-.
Motive Help Center, "What is Safety Hub?", Motive Technologies, Inc., accessed on Oct. 24, 2023 [publication date unknown], in 10 pages. URL: https://helpcenter.gomotive.com/hc/en-us/articles/6162472353053-What-is-Safety-Hub-.
Motive Help Center, "What Motive fuel features are available?", Motive Technologies, Inc., accessed on Oct. 24, 2023 [publication date unknown], in 2 pages. URL: https://helpcenter.gomotive.com/hc/en-us/articles/6189158796445-What-Motive-fuel-features-are-available-.
Motive Help Center, "What unsafe behaviors does Motive monitor through Dashcam and Vehicle Gateway?", Motive Technologies, Inc., accessed on Feb. 21, 2024 [publication date unknown], in 5 pages. URL: https://helpcenter.gomotive.com/hc/en-us/articles/6858636962333-What-unsafe-behaviors-does-Motive-monitor-through-Dashcam-and-Vehicle-Gateway-#01HCB72T2EXXW3FFVJ1XSDEG77.
Motive Help Center, "What unsafe behaviors does Motive monitor through Dashcam and Vehicle Gateway?", Motive Technologies, Inc., accessed on Oct. 25, 2023 [publication date unknown], in 4 pages. URL: https://helpcenter.gomotive.com/hc/en-us/articles/6858636962333-What-are-unsafe-behaviors-.
Motive, "AI dash cam comparison: Motive, Samsara, Lytx", Motive Technologies, Inc., [publication date unknown]. URL: https://gomotive.com/products/dashcam/fleet-dash-cam-comparison/#seat-belt-use (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 9 pages.
Motive, "AI dash cam comparison: Motive, Samsara, Lytx", Motive Technologies, Inc., accessed on Feb. 18, 2024 [publication date unknown], in 20 pages. URL: https://gomotive.com/products/dashcam/fleet-dash-cam-comparison/.
Motive, "Asset Gateway Installation Guide | Cable/Vehicle Powered" [video], YouTube, Jun. 25, 2020, screenshot in 1 page. URL: https://www.youtube.com/watch?v=pME-VMauQgY.
Motive, "Asset Gateway Installation Guide | Solar Powered" [video], YouTube, Jun. 25, 2020, screenshot in 1 page. URL: https://www.youtube.com/watch?v=jifKM3GT6Bs.
Motive, "Benchmarking AI Accuracy for Driver Safety" [video], YouTube, Apr. 21, 2022, screenshot in 1 page. URL: https://www.youtube.com/watch?v=brRt2h0J80E.
Motive, "CEO Shoaib Makani's email to Motive employees.", Motive Technologies, Inc., Dec. 7, 2022, in 5 pages. URL: https://gomotive.com/blog/shoaib-makanis-message-to-employees/.
Motive, "Coach your drivers using the Motive Safety Hub." [video], YouTube, Mar. 27, 2023, screenshot in 1 page. URL: https://www.youtube.com/watch?v=VeErPXF30js.
Motive, "Equipment and trailer monitoring", Motive Technologies, Inc., accessed on Feb. 18, 2024 [publication date unknown], in 11 pages. URL: https://gomotive.com/products/tracking-telematics/trailer-tracking/.
Motive, "Experts agree, Motive is the most accurate, fastest AI dash cam.", Motive Technologies, Inc., accessed Feb. 21, 2024 [publication date unknown] in 16 pages. URL: https://gomotive.com/products/dashcam/best-dash-cam/.
Motive, "Guide: AI Model Development", Motive Technologies, Inc., accessed on Mar. 29, 2024 [publication date unknown], Document No. 2022Q1_849898994, in 14 pages.
Motive, "Guide: DRIVE risk score", Motive Technologies, Inc., accessed on Apr. 8, 2023 [publication date unknown], Document No. 2022Q2_849898994, in 22 pages.
Motive, "Guide: Smart Event Thresholds", Motive Technologies, Inc., accessed on Apr. 8, 2023 [publication date unknown], Document No. 2022Q1_902914404, in 11 pages.
Motive, "How to install a Motive Vehicle Gateway in light-duty vehicles." [video], YouTube, Aug. 5, 2022, screenshot in 1 page. URL: https://www.youtube.com/watch?v=WnclRs_cFw0.
Motive, "How to install your Motive AI Dashcam." [video], YouTube, Aug. 5, 2022, screenshot in 1 page. URL: https://www.youtube.com/watch?v=3JNG2h3KnU4.
Motive, "IFTA fuel tax reporting", Motive Technologies, Inc., accessed on Feb. 18, 2024 [publication date unknown], in 4 pages. URL: https://gomotive.com/products/fleet-compliance/ifta-fuel-tax-reporting/.
Motive, "Improve road and fleet safety with driver scores.", Motive Technologies, Inc., Feb. 7, 2019, in 5 pages. URL: https://gomotive.com/blog/improve-fleet-safety-driver-scores/.
Motive, "Industry-leading fleet management solutions", Motive Technologies, Inc., accessed on Feb. 18, 2024 [publication date unknown], in 13 pages. URL: https://gomotive.com/products/.

(56) References Cited

OTHER PUBLICATIONS

Motive, "Introducing an easier way to manage unidentified trips.", Motive Technologies, Inc., Apr. 30, 2020, in 5 pages. URL: https://gomotive.com/blog/introducing-easier-ude-management/.
Motive, "Introducing Motive Driver Workflow.", Motive Technologies, Inc., Oct. 16, 2017, in 5 pages. URL: https://gomotive.com/blog/motive-driver-workflow/.
Motive, "Introducing the Motive Asset Gateway and dual-facing Smart Dashcam.", Motive Technologies, Inc., Sep. 9, 2019, in 5 pages. URL: https://gomotive.com/blog/trailer-tracking-and-dual-facing-dash-cam-introducing/.
Motive, "Introducing the Motive Smart Dashcam", Motive Technologies, Inc., Jun. 6, 2018. URL: https://gomotive.com/blog/announcing-smart-dashcam (filed with Feb. 8, 2024 ITC Complaint, In the Matter of Certain Vehicle Telematics, Fleet Management, and Video-Based Safety Systems, Devoces, and Components thereof, Investigation No. 337-TA-1393), in 9 pages.
Motive, "KeepTruckin ELD Training for Drivers" [video], YouTube, Feb. 2, 2018, screenshot in 1 page. URL: https://www.youtube.com/watch?v=LKJLIT2bGS0.
Motive, "KeepTruckin Smart Dashcam" [video], Facebook, Jun. 6, 2018. URL: https://www.facebook.com/keeptrucking/videos/keeptrucking-smart-dashcam/10212841352048331/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.
Motive, "Motive Fleet View | Advanced GPS system for live and historical fleet tracking." [video], YouTube, Jan. 23, 2023, screenshot in 1 page. URL: https://www.youtube.com/watch?v=CSDiDZhjVOQ.
Motive, "Motive introduces Reefer Monitoring for cold chain logistics.", Motive Technologies, Inc., Oct. 4, 2022, in 5 pages. URL: https://gomotive.com/blog/motive-introduces-reefer-monitoring-for-cold-chain-logistics/.
Motive, "Motive Reefer Monitoring for cold chain logistics." [video], YouTube, Oct. 5, 2022, screenshot in 1 page. URL: https://www.youtube.com/watch?v=rDwS5AmQp-M.
Motive, "Motive Smart Load Board—designed to help you find the right loads faster." [video], YouTube, Nov. 28, 2022, screenshot in 1 page. URL: https://www.youtube.com/watch?v=UF2EQBzLYYk.
Motive, "Motive vs. Samsara: What's the difference?", Motive Technologies, Inc., accessed Feb. 21, 2024 [publication date unknown], in 16 pages. URL: https://gomotive.com/motive-vs-samsara/#compare-chart.
Motive, "No time for downtime—automate fleet maintenance schedules" [video], YouTube, Dec. 20, 2022, screenshot in 1 page. URL: https://www.youtube.com/watch?v=flUccP-ifaU.
Motive, "Product Brief: Driver Safety", Motive Technologies, Inc., accessed on Oct. 24, 2023 [publication date unknown], Document No. 2023Q2_1204527735206670, in 4 pages.
Motive, "Product Brief: System Overview", Motive Technologies, Inc., accessed on Oct. 24, 2023 [publication date unknown], Document No. 2022Q4_1203331000367178, in 4 pages.
Motive, "Product Brief: Tracking & Telematics", Motive Technologies, Inc., accessed on Oct. 24, 2023 [publication date unknown], Document No. 2022Q3_ 1202933457877590, in 4 pages.
Motive, "Products | AI Dashcam—Smart, accurate, and responsive AI dash cams.", Motive Technologies, Inc., [publication date unknown]. URL: https://gomotive.com/products/dashcam/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 7 pages.
Motive, "Products | AI Dashcam—Smart, accurate, and responsive AI dash cams.", Motive Technologies, Inc., accessed on Feb. 18, 2024 [publication date unknown], in 9 pages. URL: https://gomotive.com/products/dashcam/.
Motive, "Products | Dispatch—Manage your dispatches with ease.", Motive Technologies, Inc., accessed on Feb. 18, 2024 [publication date unknown], in 9 pages. URL: https://gomotive.com/products/dispatch-workflow/.
Motive, "Products | Driver Safety—Protect your fleet and profits with an all-in-one safety solution.", Motive Technologies, Inc., accessed on Feb. 18, 2024 [publication date unknown], in 13 pages. URL: https://gomotive.com/products/driver-safety/.
Motive, "Products | Driver Safety—Protect your fleet and profits with an all-in-one safety solution.", Motive Technologies, Inc., accessed on Feb. 5, 2024 [publication date unknown]. URL: https://gomotive.com/products/driver-safety/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 16 pages.
Motive, "Products | Platform—Everything you need to manage your fleet. In one place.", Motive Technologies, Inc., accessed on Feb. 7, 2024 [publication date unknown]. URL: https://gomotive.com/products/platform/ (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 12 pages.
Motive, "Products | Reefer Monitoring—The strongest link in cold chain transportation.", Motive Technologies, Inc., accessed on Feb. 18, 2024 [publication date unknown], in 8 pages. URL: https://gomotive.com/products/reefer-monitoring-system/.
Motive, "Products | Tracking & Telematics - Track and monitor your fleet.", Motive Technologies, Inc., accessed on Feb. 18, 2024 [publication date unknown], in 11 pages. URL: https://gomotive.com/products/tracking-telematics/.
Motive, "Spec Sheet: AI Dashcam", Motive Technologies, Inc., accessed on Oct. 24, 2023 [publication date unknown], Document No. 2022Q3_1202788858717595, in 5 pages.
Motive, "Spec Sheet: Asset Gateway", Motive Technologies, Inc., accessed on Mar. 15, 2023 [publication date unknown], Document No. 2022Q1_849551229, in 6 pages.
Motive, "Take control of your fleet with Groups and Features Access.", Motive Technologies, Inc., Apr. 4, 2017, in 3 pages. URL: https://gomotive.com/blog/take-control-fleet-groups-features-access/.
Motive, "Take the time and hassle out of IFTA fuel tax reporting with Motive's fleet card." [video], YouTube, Jan. 26, 2023, screenshot in 1 page. URL: https://www.youtube.com/watch?v=OEN9Q8X3j6l.
Motive, "The most accurate AI just got better.", Motive Technologies, Inc., Mar. 8, 2023, in 8 pages. URL: https://gomotive.com/blog/fewer-fleet-accidents-with-the-new-ai/.
Motive, "The Motive Driver App: Change current duty status in your driving log." [video], YouTube, Aug. 10, 2022, screenshot in 1 page. URL: https://www.youtube.com/watch?v=m4HPnM8BLBU.
Motive, "The Motive Driver App: Claim and correct unidentified trips." [video], YouTube, Sep. 13, 2022, screenshot in 1 page. URL: https://www.youtube.com/watch?v=z2_kxd3dRac.
Motive, "The Motive Driver App: Connect to the Vehicle Gateway." [video], YouTube, Sep. 13, 2022, screenshot in 1 page. URL: https://www.youtube.com/watch?v=egZmLYDa3kE.
Motive, "The Motive Driver App: Creating fleet vehicle inspection reports." [video], YouTube, Aug. 10, 2022, screenshot in 1 page. URL: https://www.youtube.com/watch?v=u1JI-rZhbdQ.
Motive, "The Motive Driver App: Digitally record hours of service (HOS)." [video], YouTube, Aug. 10, 2022, screenshot in 1 page. URL: https://www.youtube.com/watch?v=gdexlb_zqtE.
Motive, "The Motive Driver App: Insert past duty driving log status." [video], YouTube, Aug. 10, 2022, screenshot in 1 page. URL: https://www.youtube.com/watch?v=TmOipFKPBeY.
Motive, "The Motive Driver App: Switch to DOT inspection mode to share driving logs." [video], YouTube, Aug. 10, 2022, screenshot in 1 page. URL: https://www.youtube.com/watch?v=S2LR1ZUImBU.
Motive, "The Motive Driver App: View hours of service (HOS) violations." [video], YouTube, Aug. 10, 2022, screenshot in 1 page. URL: https://www.youtube.com/watch?v=qJX2ZiBGtV8.
Motive, "U.S. speed limits. What drivers and fleets need to know.", Motive Technologies, Inc., Jan. 13, 2022, in 8 pages. URL: https://gomotive.com/blog/us-speed-limits-for-drivers/.
Motive, "What is an AI dashcam?", Motive Technologies, Inc., Jan. 21, 2022, in 6 pages. URL: https://gomotive.com/blog/what-is-ai-dashcam/.

(56) References Cited

OTHER PUBLICATIONS

Motive, "WiFi Hotspot sets you free from restrictive cell phone data plans.", Motive Technologies, Inc., Jun. 27, 2019, in 5 pages. URL: https://gomotive.com/blog/wifi-hotspot/.
Motive, "WiFi Hotspot", Motive Technologies, Inc., accessed on Feb. 18, 2024 [publication date unknown], in 5 pages. URL: https://gomotive.com/products/wifi-hotspot/.
Multivu.com, "Powerful Technology ER-SV2 Event Recorder", Lytx Inc., 2015, in 2 pages. URL: https://www.multivu.com/players/English/7277351-lytx-activevision-distracted-driving/document/52a97b52-6f94-4b11-b83b-8c7d9cef9026.pdf.
Nauto, "How Fleet Managers and Safety Leaders Use Nauto" [video], YouTube, Jan. 25, 2018, screenshot in 1 page. URL: https://www.youtube.com/watch?v=k_iX7a6j2-E.
Nauto, "The New World of Fleet Safety—Event Keynote" [video], YouTube, Jul. 9, 2020, screenshot in 1 page. URL: https://www.youtube.com/watch?v=iMOab9Ow_CY.
Netradyne Inc., "Netradyne Introduces New DriverStar Feature to Recognize and Reward Safe Driving", PR Newswire, Netradyne, Inc., Oct. 19, 2017, in 2 pages. URL: https://www.prnewswire.com/news-releases/netradyne-introduces-new-driverstar-feature-to-recognize-and-reward-safe-driving-300540267.html.
Netradyne India, "Netradyne Driveri Covered in BBC Click" [video], YouTube, Jan. 25, 2018, screenshot in 1 page. URL: https://www.youtube.com/watch?v=jhULDLj9iek.
Netradyne presentation, Netradyne, Oct. 2016, in 23 pages.
Netradyne, "Driver•i™ Catches No Stop ad Stop Sign | Fleet Management Technology" [video], YouTube, Oct. 3, 2017, screenshot in 1 page. URL: https://www.youtube.com/watch?v=18sX3X02aJo.
Netradyne, "Driver•i™ Flags Commercial Driver Running Red Light—360-degree vi" [video], YouTube, Oct. 3, 2017, screenshot in 1 page. URL: https://www.youtube.com/watch?v=au9_ZNGYCmY.
Netradyne, Driver Card 1, 2018, in 2 pages (ND_ITC_0001-ND_ITC_0002).
Netradyne, Driver Card 2, 2018, in 2 pages (ND_ITC_0003-ND_ITC_0004).
Ohidan, A., "Fiat and AKQA Launch Eco:Drive™", Science 2.0, Oct. 7, 2008, in 4 pages. URL: https://www.science20.com/newswire/fiat_and_akqa_launch_eco_drive_tm.
Perez, L. et al., "Robot Guidance Using Machine Vision Techniques in Industrial Environments: A Comparative Review", Sensors, Mar. 2016, vol. 16(3), in 27 pages.
Puckett, T. et al. "Safety Track 4B-Driver Risk Management Program", Airports Council International, Jan. 18, 2019, in 29 pages. URL: https://airportscouncil.org/wp-content/uploads/2019/01/4b-DRIVER-RISK-MANAGEMENT-PROGRAM-Tamika-Puckett-Rob-Donahue.pdf.
Ramkumar, S. M. et al., "Chapter 14 Web Based Automated Inspection and Quality Management", in Web-Based Control and Robotics Education, 2009, ed., Spyros G. Tzafestas, Springer, in 42 pages.
Tzafestas, S. G. (ed.), *Web-Based Control and Robotics Education,* 2009, Springer, ISBN 978-90-481-2504-3, in 362 pages. [uploaded in 3 parts].
Samsara Support, "AI Event Detection", Samsara Inc., accessed on Feb. 7, 2024 [publication date unknown]. URL: https://kb.samsara.com/hc/en-us/articles/360043619011-AI-Event-Detection#UUID-4790b62c-6987-9c06-28fe-c2e2a4fbbb0d (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.
Samsara Support, "Alert Configuration", Samsara Inc., accessed Feb. 7, 2024 [publication date unknown]. URL: https://kb.samsara.com/hc/en-us/articles/217296157-Alert-Configuration (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 5 pages.
Samsara Support, "Alert Triggers", Samsara Inc., accessed Feb. 7, 2024 [publication date unknown]. URL: https://kb.samsara.com/hc/en-us/articles/360043113772-Alert-Triggers (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 6 pages.
Samsara Support, "Automatic Driver Detection (Camera ID)", Samsara Inc., accessed on Feb. 7, 2024 [publication date unknown]. URL: https://kb.samsara.com/hc/en-us/articles/360042878172#UUID-294cf192-f2f6-2c5a-3221-9432288c9b25 (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.
Samsara Support, "Dash Cam Recording Logic", Samsara Inc., accessed on Feb. 7, 2024 [publication date unknown]. URL: https://kb.samsara.com/hc/en-us/articles/360011372211-Dash-Cam-Recording-Logic (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.
Samsara Support, "Dash Cam Settings Overview", Samsara Inc., accessed on Feb. 7, 2024 [publication date unknown]. URL: https://kb.samsara.com/hc/en-us/articles/360042037572-Dash-Cam-Settings-Overview (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.
Samsara Support, "Rolling Stop Detection", Samsara Inc., accessed on Feb. 7, 2024 [publication date unknown]. URL: https://kb.samsara.com/hc/en-us/articles/360029629972-Rolling-Stop-Detection (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 2 pages.
Samsara Support, "Safety Score Categories and Calculation", Samsara Inc., [publication date unknown]. URL: https://kb.samsara.com/hc/en-us/articles/360045237852-Safety-Score-Categoriesand-Calculation (filed with Feb. 8, 2024 ITC Complaint, In the Matter of Certain Vehicle Telematics, Fleet Management, and Video-Based Safety Systems, Devices, and Components thereof, Investigation No. 337-TA-1393), in 3 pages.
Samsara Support, "Safety Score Weights and Configuration", Samsara Inc., accessed Feb. 7, 2024 [publication date unknown]. URL: https://kb.samsara.com/hc/en-US/articles/360043160532-Safety- Score-Weights-and-Configuration#UUID-fcb096dd-79d6-69fc-6aa8-5192c665be0a_sectionidm4585641455801633238429578704 (filed with 2024-02-08 ITC Complaint, In the Matter of Certain Vehicle Telematics, Fleet Management, and Video-Based Safety Systems, Devices, and Components thereof, Investigation No. 337-TA-1393), in 4 pages.
Samsara, "AI Dash Cams", Samsara, Inc., [publication date unknown] (filed with 2024-02-08 ITC Complaint, In the Matter of Certain Vehicle Telematics, Fleet Management, and Video-Based Safety Systems, Devices, and Components thereof, Investigation No. 337-TA-1393), in 9 pages.
Samsara, "CM31 Dash Camera Datasheet - Internet-Connected Front-Facing HD Camera Module", [publication date unknown] (filed with 2024-02-08 ITC Complaint, In the Matter of Certain Vehicle Telematics, Fleet Management, and Video-Based Safety Systems, Devices, and Components thereof, Investigation No. 337-TA-1393), in 4 pages.
Samsara, "CM32 Dash Camera - Internet-Connected Dual-Facing HD Camera Module", [publication date unknown] (filed with 2024-02-08 ITC Complaint, In the Matter of Certain Vehicle Telematics, Fleet Management, and Video-Based Safety Systems, Devices, and Components thereof, Investigation No. 337-TA-1393), in 2 pages.
Samsara, "Unpowered Asset Tracker AG45 Datasheet", accessed Feb. 21, 2024 [publication date unknown], in 4 pages. URL: https://www.samsara.com/pdf/docs/AG45_Datasheet. pdf.
Samsara, "Vehicle Gateways - VG34, VG54, VG54H Datasheet", [publication date unknown] (filed with 2024-02-08 ITC Complaint, In the Matter of Certain Vehicle Telematics, Fleet Management, and Video- Based Safety Systems, Devices, and Components thereof, Investigation No. 337-TA-1393), in 8 pages.

(56) References Cited

OTHER PUBLICATIONS

Sindhu MV, "How this three-year-old Bengaluru startup is helping make US roads safer with its video analytics solutions", Yourstory.com, Mar. 26, 2018, in 7 pages. URL: https://yourstory.com/2018/03/lightmetrics-road-safety-analytics.

Smart Dash Cam Vezo360!, "Vivek Soni Co-Founder at Arvizon" [video], YouTube, Feb. 21, 2019, screenshot in 1 page. URL: https://www.youtube.com/watch?v=leclwRCb5ZA.

Song, T et al., "Enhancing GPS with Lane-level Navigation to Facilitate Highway Driving", IEEE Transactions on Vehicular Technology, Jun. 2017 (published on Jan. 30, 2017), vol. 66, No. 6, in 12 pages.

Song, T et al., "Enhancing GPS with Lane-level Navigation to Facilitate Highway Driving", IEEE Transactions on Vehicular Technology, Jun. 2017 (published on Jan. 30, 2017), vol. 66, No. 6, pp. 4579-4591, in 13 p.

Soumik Ukil, " LightMetrics ADAS demo" [video], YouTube, Jul. 20, 2017, screenshot in 1 page. URL: https://www.youtube.com/watch?app=desktop&v=9LGz1007dTw.

Steger, C et al., "Chapter 2 Image Acquisition" and "Chapter 3 Machine Vision Algorithms", in Machine Vision Algorithms and Applications, 2018, 2nd ed., Wiley, in 604 pages.

|Steger, C et al., Machine Vision Algorithms and Applications, 2018, 2nd ed., Wiley, in 60 pages.

Straight, B. "Over 20 years later, Lytx continues to evolve alongside the industry it serves", FreightWaves, Apr. 16, 2019, in 4 pages. URL: https://www.freightwaves.com/news/technology/the- evolution-of-lytx.

Straight, B., "Netradyne using Al to provide intelligent insight into distracted driving", Netradyne, Inc., Nov. 8, 2017, in 4 pages. URL: https://www.freightwaves.com/news/2017/11/7/netradyne- using-ai-to-provide-intelligent-insight-into-distracted-driving.

Su, C.-C. et al., "Bayesian depth estimation from monocular natural images", Journal of Vision, 2017, vol. 17(5):22, pp. 1-29.

Sung, T.-W. et al., "A Speed Control Scheme of Eco-Driving at Road Intersections", 2015 Third International Conference on Robot, Vision and Signal Processing, 2015, pp. 51-54.

Suppose U Drive, "New Trucking Tech: Forward Facing Cameras" supposeudrive.com, Mar. 15, 2019, in p. 7. URL: https://supposeudrive.com/new-trucking-tech-forward-facing-cameras/.

The Wayback Machine, "AT&T Fleet Complete—Give your Business a competitive advantage", AT&T, 2019, in 12 pages. URL: https://web.archive.org/web/20190406125249/http:/att.fleetcomplete.com/.

The Wayback Machine, "Introducing Driver-I™", NetraDyne, Sep. 22, 2016, in 4 pages URL: https://web.archive.org/web/20160922034006/http://www.netradyne.com/solutions.html.

The Wayback Machine, "NetraDyne's Driver-I™ platform delivers results beyond legacy safety video systems Counting safe driving as safe driving—taking second-guessing out of commercial fleet driver safety", NetraDyne, Feb. 9, 2018, in 7 pages. URL: https://web.archive.org/web/20180209192736/http:/netradyne.com/solutions/.

Top Fives, "15 BIGGEST Data Centers on Earth" [video], YouTube, Jun. 9, 2024, screenshot in 1 page. URL: https://www.youtube.com/watch?v=1LmFmCVTppo.

Uliyar, M., "LightMetrics' RideView video safety system provides the best ROI", Linkedin, Sep. 8, 2016, in 4 pages URL: https://www.linkedin.com/pulse/lightmetrics-rideview-video-safety-system-provides-best-mithun-uliyar/.

Vezo 360, "World's Smartest Dash Cam Powered by AI" [video], YouTube, Mar. 31, 2019, screenshot in 1 page. URL: https://www.youtube.com/watch?v=M5r5wZozS0E.

Vlahogianni, E. et al., "Driving analytics using smartphones: Algorithms, comparisons and challenges", Transportation Research Part C, Jun. 2017, vol. 79, pp. 196-206.

Wahlstrom, J. et al., "Smartphone-based Vehicle Telematics—A Ten-Year Anniversary", IEEE Transactions on Intelligent Transportation Systems, Nov. 2016, vol. 18(10), in 23 pages.

Wu, S., "Motivating High-Performing Fleets with Driver Gamification", Samsara, Feb. 2, 2018, in 4 pages. URL: https://www.samsara.com/blog/motivating-high-performing-fleets-with-driver-gamification/.

Yufeng, Z. et al., "3G-Based Specialty Vehicles Real-Time Monitoring System", Applied Mechanics and Materials, Feb. 2014, vols. 513-517, pp. 871-875.

Yufeng, Z. et al., "3G-Based Specialty Vehicles Real-Time Monitoring System", Applied Mechanics and Materials, Feb. 2014, vols. 513-517, pp. 871-875, in 7 pages.

Zanini, M. et al., "Mobile Assets Monitoring for Fleet Maintenance", SAE International, Apr. 11-14, 2005, in 9 pages.

Zanini, M. et al., "Mobile Assets Monitoring for Fleet Maintenance", SAE International, 2005, pp. 369-375, in 8 pages.

Zhong, R. Y. et al., "Intelligent Manufacturing in the Context of Industry 4.0: A Review", Engineering, Oct. 2017, vol. 3, Issue 5, pp. 616-630.

Jun. 8, 2026 Complaint for Patent Infringement, *Samsara Inc.* v. *Motive Technologies, Inc.*, In the United States District Court for The Western District of Texas Midland—Odessa Division, Civil Action No. 7:26-cv-00225, in 41 pages.

Jun. 8, 2026 Exhibit 5—Infringement Claim Chart for U.S. Pat. No. 12,140,445, *Samsara Inc.* v. *Motive Technologies, Inc.*, In the United States District Court for The Western District of Texas Midland—Odessa Division, Civil Action No. 7:26-cv-00225, in 42 pages.

Jun. 8, 2026 Exhibit 6—Infringement Claim Chart for U.S. Pat. No. 11,995,546, *Samsara Inc.* v. *Motive Technologies, Inc.*, In the United States District Court for The Western District of Texas Midland—Odessa Division, Civil Action No. 7:26-cv-00225, in 22 pages.

Jun. 8, 2026 Exhibit 7—Infringement Claim Chart for U.S. Pat. No. 12,000,940, *Samsara Inc.* v. *Motive Technologies, Inc.*, In the United States District Court for The Western District of Texas Midland—Odessa Division, Civil Action No. 7:26-cv-00225, in 29 pages.

Jun. 8, 2026 Exhibit 8—Infringement Claim Chart for U.S. Pat. No. 12,117,546, *Samsara Inc.* v. *Motive Technologies, Inc.*, In the United States District Court for The Western District of Texas Midland—Odessa Division, Civil Action No. 7:26-cv-00225, in 49 pages.

* cited by examiner

SYSTEMS AND METHODS OF REMOTE OBJECT TRACKING

CROSS-REFERENCE TO RELATED APPLICATIONS

This application is a continuation of U.S. patent application Ser. No. 18/647,246, filed Apr. 26, 2024, and titled "SYSTEMS AND METHODS OF REMOTE OBJECT TRACKING", which application is a continuation of U.S. patent application Ser. No. 18/312,534, filed May 4, 2023, and titled "SYSTEMS AND METHODS OF REMOTE OBJECT TRACKING", which application is a continuation of U.S. patent application Ser. No. 16/849,148, filed Apr. 15, 2020, and titled "SYSTEMS AND METHODS OF REMOTE OBJECT TRACKING", which application claims benefit of U.S. Provisional Patent Application No. 62/991,319, filed Mar. 18, 2020, and titled "SYSTEMS AND METHODS OF REMOTE OBJECT TRACKING." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to object tracking devices, sensors, systems, and methods that allow for power generation calculation, power consumption calculation, and processing. Embodiments of the present disclosure further relate to devices, systems, and methods that provide estimated operation time and updated device configurations.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Object tracking devices may intermittently or continuously collect information related to objects (for example, assets such as trailers) and transmit such information to a remote server. Such information may be used to determine various useful information related to the objects.

SUMMARY

The systems, methods, and devices described herein each have several aspects, no single one of which is solely responsible for its desirable attributes. Without limiting the scope of this disclosure, several non-limiting features will now be described briefly.

For object tracking devices that intermittently or continuously collect information related to objects (for example, assets such as trailers) and wirelessly transmit such information to a remote server, availability (or visibility) to users is important. In order to continue monitoring objects, such object tracking devices should remain operational for a desired period of time. Although external power sources (e.g., a grid or an external battery) may be used to provide power to object tracking devices, such solutions may not be always available. For example, when an object-of-interest is left alone at a remote location, it may be difficult to provide external power sources to an object tracking device associated with that object-of-interest.

An object tracking device can include a solar cell that can generate solar-based energy for the object tracking device, and which can be used to charge an internal battery of the object tracking device. However, it is often difficult to predict whether object tracking devices can remain operational for a desired period of time (e.g., a year or a month) because the amount of energy generated using solar cells can vary greatly depending of solar irradiance, weather condition, orientation of the solar cells, surrounding environment, and the like. Additionally, operational consumption of energy by the object tracking devices can vary greatly depending on various factors such as the configuration of the object tracking device. Therefore there is a great need to accurately forecast and estimate power generated by solar cells for object tracking devices, forecast an estimate power consumed by object tracking devices, and predict whether object tracking devices can remain operational for a certain period of time.

The embodiments of the present disclosure relate to systems and methods that allow for accurately determining estimated operation time for object tracking devices and generating an updated configuration information. Embodiments of the present disclosure further relate to systems and methods that allow for accurately determining estimated operation time for object tracking devices and generating notifications to users.

For example, according to various embodiments, the present disclosure includes a system that includes at least an object tracking device and a remote management server. The object tracking device includes at least a location determination module and a power generation module. The location determination module may determine the location of the object tracking device and the power generation module may generate electricity for the object tracking device. The remote management server may receive the location information from the object tracking device and determine estimated power generation associated with the object tracking device. The remote management server may further receive configuration information from the object tracking device and determine estimated power consumption associated with the object tracking device. The management server may further determine estimated operation time for the object tracking device based at least in part on the estimated power consumption and the estimated power generation.

In various embodiments, the object tracking device may further include an orientation determination module that may determine the orientation of the object tracking device. The orientation of the object tacking device may be used to determine the estimated power generation for the object tracking device.

In various embodiments, the management server may receive weather information associated with the location of the object tracking device. The weather information may be used to determine estimated power generation of the object tracking device.

In various embodiments, the object tracking device may collect object information associated with an object associated with the object tracking device. The object information may include, but is not limited to, temperature information, access information, visual information, and the like.

In various embodiments, the configuration information may include, but is not limited to, power consumption data, amount of power consumed per data transmission between the object tracking device and the management server, frequency of data transmission between the object tracking device and the management server, frequency of determining location of the object tracking device, frequency of determining orientation of the object tracking device, frequency of collecting object information, and the like.

In various embodiments, the management server, based at least in part on the estimated operation time, generates updated configuration data. The updated configuration data may be sent to the object tracking device to provide updated configuration.

In various embodiments, the management server, based at least in part on the estimated operation time, generates notifications. The notifications may be sent to user devices to provide at least one of the following: request to reorient the object tracking device, request to provide an external power source for the object tracking device, the estimated operation time, and the like.

Various combinations of the above and below recited features, embodiments, and aspects are also disclosed and contemplated by the present disclosure.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
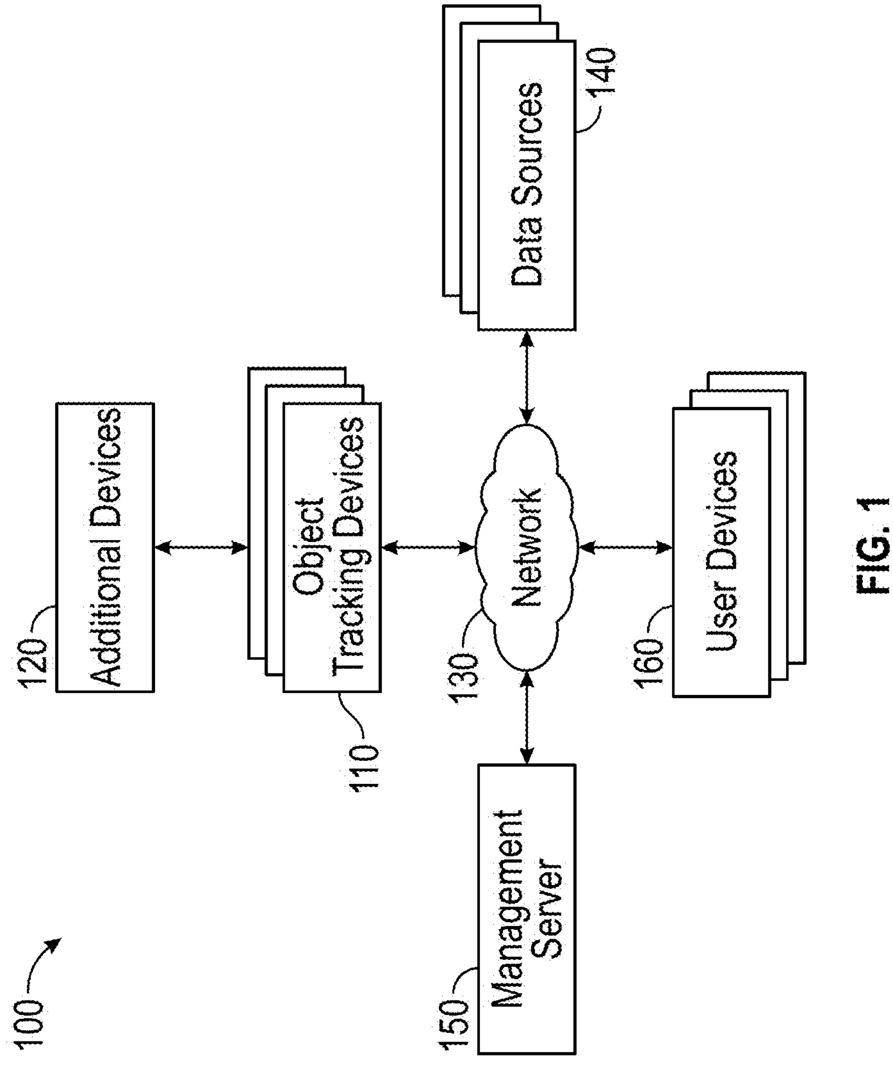
FIG. 1 illustrates a block diagram of an example operating environment in which one or more aspects of the present disclosure may operate, according to various embodiments of the present disclosure.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

I. Overview

As mentioned above, according to various embodiments, the present disclosure includes one or more object tracking devices. An object tracking device may include at least a location determination module for generating location information, for example, associated with the object tracking device positioned on a trailer. The location information may be analyzed by a remote computing system, for example, to determine location of the object tracking device, receive weather information associated with the location of the object tracking device, and determine power generation associated with the object tracking device. The object tracking device may collect information associated with an asset, for example, a trailer, that can include, but is not limited to, temperature information, access information, visual information, and the like. The object tracking device may include on-device memory for storing information associated with an asset, configuration information, location information, orientation information, and the like. The object tracking device may further include components for communicating with other devices/systems, including one or more web-servers.

In various embodiments, the object tracking devices may be configured to automatically connect to a remote management server (for example, a "cloud"-based management server), and may transmit data associated with location, configuration, or orientation of the object tracking devices to the remote management server via wired or wireless communications. The object tracking devices may further communicate with the management server or user computing devices, for example, to provide remote access to the object tracking device, provide real-time information from the object tracking device, receive configurations/updates, provide interactive graphical user interfaces, and the like.

In various embodiments, the management server may aggregate data associated with location and configuration from one or more object tracking devices, and provide statuses, alerts, analyses, etc., including via interactive graphical user interfaces that may be accessed via user computing devices. The management server may provide interactive graphical user interfaces through which a user may configure one or more object tracking devices.

In various embodiments, additional devices may communicate with the object tracking devices (and/or other systems, devices, etc.) via wired or wireless communications. The additional devices can collect information including, but not limited to, temperature, vibration, pressure, door operation, storage status related to the objects tracked by the object tracking devices.

Various aspects of the present disclosure may individually and/or collectively provide various technical advantages as described herein, and may overcome various disadvantages of prior systems and methods. For example, embodiments of the present disclosure may include object tracking devices that include built-in wireless and/or wired communications capabilities. The object tracking devices may automatically establish communication with a remote management server, additional devices, and the like. The object tracking devices may be remotely and centrally monitored and configured via the management server, for example, via a wired or wireless network. The object tracking devices may include location determination module(s), configuration database, orientation determination module(s), power generation module(s), power storage, or object information collection capabilities such that they may operate autonomously based on a current configuration. However, the object tracking devices may further transmit location information, orientation information, configuration information, and/or the like, associated with the object tracking devices to a remote database (for example, via the management server). Such location information or configuration information may be useable by the management server for providing further analyses, insights, alerts, summaries, etc. to users via interactive graphical user interfaces. The object tracking devices may provide remote access to live location information or configuration information via a web-server operating on the object tracking devices. Additional devices may communicate with the object tracking devices via wired or wireless, direct or networked communications. The object tracking devices may provide interactive graphical user interfaces to such additional devices, enabling synchronization of object tracking device status at multiple additional devices and/or other user devices.

Advantageously, according to various embodiments, the present disclosure may provide an object tracking system that determines estimated operation time for an object tracking device. The present disclosure may provide a system to updated configuration data to object tracking devices to provide improved estimated operation time. Moreover, the present disclosure may provide a system to provide notifications based at least in part on the estimated operation time.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Terms

In order to facilitate an understanding of the systems and methods discussed herein, a number of terms are defined below. The terms defined below, as well as other terms used herein, should be construed broadly to include the provided definitions, the ordinary and customary meaning of the terms, and/or any other implied meaning for the respective terms. Thus, the definitions below do not limit the meaning of these terms, but only provide example definitions.

User Input (also referred to as "Input"): Any interaction, data, indication, etc., received by a system/device from a user, a representative of a user, an entity associated with a user, and/or any other entity. Inputs may include any interactions that are intended to be received and/or stored by the system/device; to cause the system/device to access and/or store data items; to cause the system to analyze, integrate, and/or otherwise use data items; to cause the system to update to data that is displayed; to cause the system to update a way that data is displayed; and/or the like. Non-limiting examples of user inputs include keyboard inputs, mouse inputs, digital pen inputs, voice inputs, finger touch inputs (for example, via touch sensitive display), gesture inputs (for example, hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (for example, fist, hand flat, one finger extended, etc.), and/or the like. For example, user inputs may comprise a position, orientation, and/or motion of a hand or other appendage, a body, a 3D mouse, and/or the like.

Data Store: Any computer readable storage medium and/or device (or collection of data storage mediums and/or devices). Examples of data stores include, but are not limited to, optical disks (for example, CD-ROM, DVD-ROM, etc.), magnetic disks (for example, hard disks, floppy disks, etc.), memory circuits (for example, solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (for example, Oracle databases, PostgreSQL databases, etc.), non-relational databases (for example, NoSQL databases, etc.), in-memory databases, spreadsheets, comma separated values (CSV) files, eXtendible markup language (XML) files, TEXT (TXT) files, flat files, spreadsheet files, and/or any other widely used or proprietary format for data storage. Databases are typically stored in one or more data stores. Accordingly, each database referred to herein (for example, in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Example Operating Environment

FIG. 1 illustrates a block diagram of an example operating environment 100 in which one or more aspects of the present disclosure may operate, according to various embodiments of the present disclosure. The operating environment 100 may include one or more user devices 160, a management server 150, one or more object tracking devices 110, one or more data sources 140, and one or more additional devices 120. The various devices may communicate with one another via, for example, a network 130, as illustrated.

In general, the object tracking device 110 comprises a housing including processor(s), memory, data input/output (I/O) interface(s), power generating module(s), location determination module(s), orientation determination module(s), controller(s), etc. that may be affixed to, or positioned near an object, (for example, an asset, a container, or a trailer). For example, the object tracking device 110 may be coupled to or positioned on a trailer. The object tracking device 110 may determine location information associated with the object tracking device 110, determine a current configuration information associated with the object tracking device 110, and transmit aforementioned location information and configuration information to the management server based at least in part on the current configuration of the object tracking device 110. Additionally, the object tracking device 110 may determine orientation information associated with the object tracking device and transmit the orientation information to the management server.

Configurations of the object tracking device 110 may include power consumption information associated with the object tracking device 110, data collection frequency (for example, frequency of collecting the location information associated with the object tracking device 110), data transmission frequency (for example, transmission of the location information between the object tracking device 110 and the management server), an amount of power consumption per data transmission between the object tracking device 110 and the management server, or network connectivity information, as described herein.

Additionally, the object tracking device 110 may collect object information associated with the object associated with the object tracking device 110. The object tracking device 110 may collect object information based at least in part on the current configuration information of the object tracking device 110. The object information may be collected continuously, periodically, on a predetermined time interval, on demand, and/or the like.

The object information, the orientation information, the location information, and the configuration information associated with the object tracking device 110 may be stored in a memory of the object tracking device 110 (for example, a computer readable storage medium). For example, such data may be automatically transmitted intermittently or continuously from the object tracking device 110 to the management server 150. The management server 150 may thereby receive location information and configuration information from multiple object tracking devices 110, and may aggregate and perform further analyses on the location information and configuration information from multiple object tracking devices 110.

The management server 150 may communicate with the object tracking device(s) 110 to enable remote, rapid configuration of the object tracking device(s) 110. Such configuration may be accomplished via interactive graphical user interfaces provided by the management server 150. In some embodiments, such interactive graphical user interfaces may be accessible by the user device(s) 160. Via the management server 150, and/or directly by communication with the object tracking device(s) 110, user device(s) 160 may access real-time views of status, location information analysis, configuration information analysis, and the like of the object tracking device(s) 110. Communications with the object tracking device(s) 110 may be accomplished via web-servers executing on the object tracking devices 110 themselves.

In some embodiments, the features and services provided by the management server 150 may be implemented as web services consumable via the network 130. In further embodiments, the management server 150 is provided by one or more virtual machines implemented in a hosted computing environment. The hosted computing environment may include one or more rapidly provisioned and released computing resources, which computing resources may include computing, networking and/or storage devices.

In general, the data sources 140 may be any type of database, data store, or server that can collect and store various types of information, for example, weather information, solar cell information, solar cell degradation information, network connectivity information, and the like. The data sources 140 may be remote from the management server 150 and may have communication capabilities to wireless communication with the management server 150, for example, via the network 130.

The additional device(s) 120 may comprise various devices/sensors that can collect information associated with an object, for example, a trailer, associated with the object tracking device 110. The additional device(s) 120 may be in communication with the object tracking device(s) 110 and transmit the information associated with the object, for example, a trailer, to the object tracking device(s) 110.

In general, the user devices 160 can be any computing device such as a desktop, laptop or tablet computer, personal computer, tablet computer, wearable computer, server, personal digital assistant (PDA), hybrid PDA/mobile phone, mobile phone, smartphone, set top box, voice command device, digital media player, and the like. A user device 160 may execute an application (for example, a browser, a stand-alone application, etc.) that allows a user to access interactive user interfaces, analyses, or aggregated data, or the like as described herein. In various embodiments, users may interact with various components of the example operating environment 100 (for example, the management server 150, the object tracking device(s) 110, the additional device(s) 120, etc.) via the user device(s) 160. Such interactions may typically be accomplished via interactive graphical user interfaces, however alternatively such interactions may be accomplished via command line, and/or other means.

The network 130 may include any wired network, wireless network, or combination thereof. For example, the network 130 may be a personal area network, local area network, wide area network, over-the-air broadcast network (for example, for radio or television), cable network, satellite network, cellular telephone network, or combination thereof. As a further example, the network 130 may be a publicly accessible network of linked networks, possibly operated by various distinct parties, such as the Internet. In some embodiments, the network 130 may be a private or semi-private network, such as a corporate or shared intranet. The network 130 may include one or more wireless networks, such as a Global System for Mobile Communications (GSM) network, a Code Division Multiple Access (CDMA) network, a Long Term Evolution (LTE) network, or any other type of wireless network. The network 130 can use protocols and components for communicating via the Internet or any of the other aforementioned types of networks. For example, the protocols used by the network 130 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In some embodiments, the network 130 may include an external network, a local network, or both. The local network can be local to a particular organization (for example, a private or semi-private network), such as a corporate or shared intranet. In some implementations, devices may communicate via the local network without traversing the external network such as the Internet. In some implementations, devices connected via the local network may be walled off from accessing the external network (for example, the Internet), for example, by a gateway device, unless specifically granted access to the external network. Accordingly, for example, the user device(s) 160 may communicate with the object tracking device 110 directly (via wired or wireless communications) or via the local network, without traversing the external network. Thus, even if the external network is down, or is not currently providing connectivity to the management server 150, the object tracking device(s) 110, and the user device(s) 160 may continue to communicate and function via the local network (or via direct communications).

In various embodiments, communications among the various components of the example operating environment 100 may be accomplished via any suitable means. For example, the object tracking device(s) 110 may communicate with one another, the additional device(s) 120, the data sources 140, the management server 150, and/or the user device(s) 160 via any combination of the network 130 and any other wired or wireless communications means or method (for example, Bluetooth, WiFi, infrared, cellular, etc.).

Further details and examples regarding the implementations, operation, and functionality, including various interactive graphical user interfaces, of the various components of the example operating environment 100 are described herein in reference to various figures.

Example Management Device/Server

Figure 2:
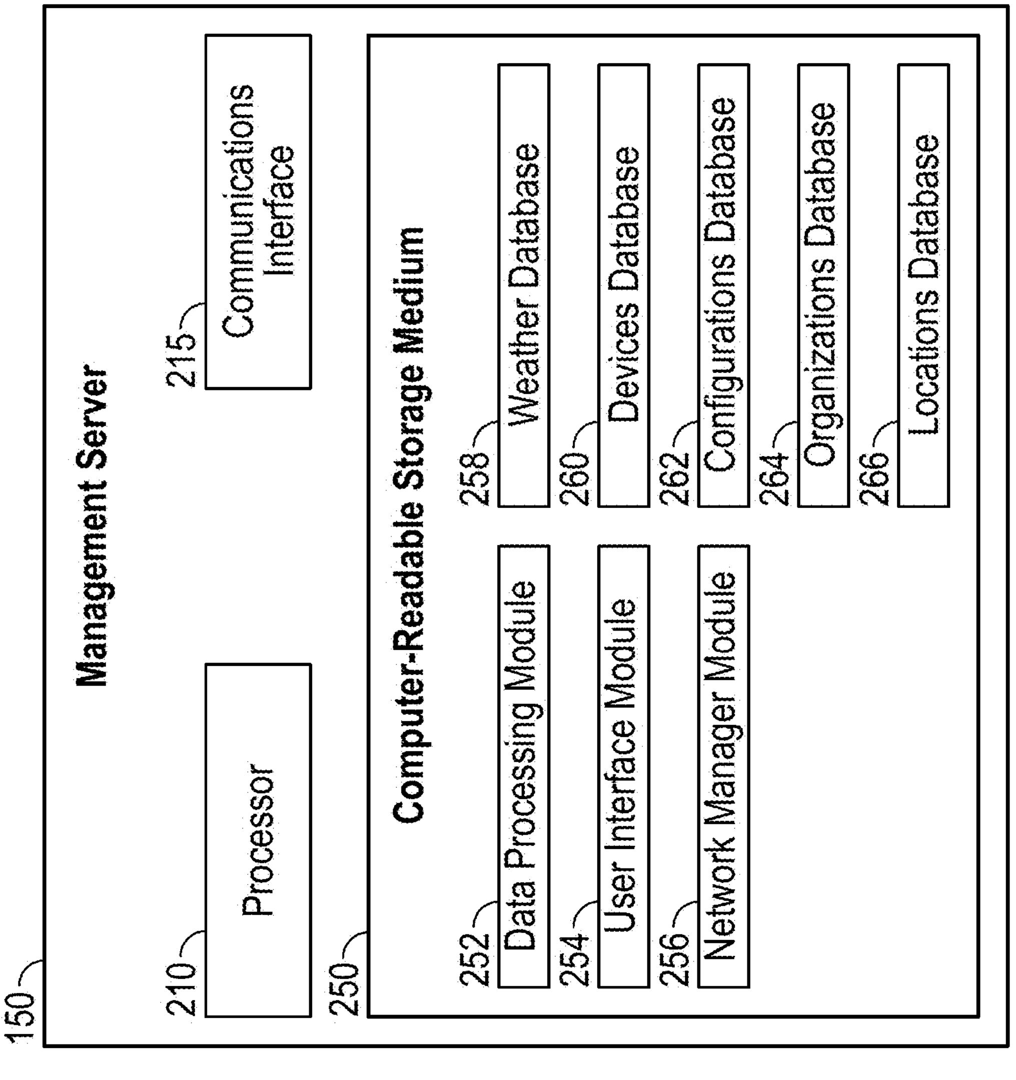
FIG. 2 illustrates a block diagram including an example implementation of a management server, according to various embodiments of the present disclosure.

FIG. 2 illustrates a block diagram including an example implementation of a management server 150, according to various embodiments of the present disclosure. The management server 150 may be a Web or cloud server, or a cluster of servers, running on one or more sets of server hardware. In an embodiment, the management server 150 may work for multiple organizations with different administrators that may have, for example, multiple object tracking device(s) 110 and additional device(s) 120.

According to various embodiments, management server 150 may include one or more communication interfaces 215, one or more processors 210, and one or more computer readable storage mediums 250, each of which may be in communication with one another. The computer readable storage medium 250 includes data processing module 252, user interface module 254, network manager module 256, weather database 258, devices database 260, configurations database 262, organizations database 264, and locations database 266. In various implementations, the various databases of the management server 150 may be combined or separated/partitioned as appropriate to implement the functionality described herein, and to maintain security and separation of data, for example, for different organizations. In various implementations, the various databases may or may not be stored separately from the management server 150.

In various implementations one or more interfaces, APIs, communication layers, buses, interconnects, wires/cables, etc. may be used to interconnect the various components of the management server 150.

In operation, the one or more communication interfaces 215, one or more processors 210, and one or more computer readable storage mediums 250 communicate with one another to, for example, execute by the processor(s) 210 computer program instructions (for example, as provided by the user interface module 254); receive, access, and transmit data (for example, to/from the databases and via the communication interface(s) 215); and/or the like. In general, the processor 210, the communication interface 215, and the computer readable storage medium 250 enable the functionality of the management server 150 as described herein. Further implementation details are described below.

In operation, the communication interface(s) 215 may provide wired or wireless communications with other devices and networks, as described herein. In various embodiments, communications among the various components of the example operating environment 100 may be accomplished via any suitable means. For example, the management server 150 may communicate with the object tracking device 110, the data source(s) 140, the additional device(s) 120, and/or the user device(s) 160 via any combination of the network 130 or any other communications means or method (for example, Bluetooth, WiFi, infrared, cellular, etc.). Accordingly, the communications interface(s) 215 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (for example, 2G, 3G, 4G, 5G), or the like.

In operation, data processing module 252 may provide processing and analysis of data (for example, data received from the various devices, including the object tracking device(s) 110 and/or additional device(s) 120) as described herein. The data processing/analysis may usefully provide insights and information that may be provided via various interactive graphical user interfaces, as described herein.

In operation, the user interface module 254 may provide the various interactive graphical user interface functionality described herein. This may include, for example, generating user interface data useable for rendering the various interactive user interfaces described. The user interface data may be used by various computer systems, devices, and/or software programs (for example, a browser program of a user device 160), to render the interactive user interfaces. The interactive user interfaces may be displayed on, for example, electronic displays (including, for example, touch-enabled displays). For example, the user interface module 254 may provide various network accessible interactive graphical user interfaces, for example, to allow the administrators of the various organizations and devices to create and log into an account associated with an organization to which a set of devices belong (for example, object tracking device(s) 110 and additional device(s) 120), and manage, and access data associated with, those devices as described herein.

In operation, the network manager module 256 may provide communication with and configuration and management of the various devices associated with each organization. This may include, for example, receiving and managing information related to the various devices (for example, object tracking device(s) 110 and additional device(s) 120) at the time of manufacture, associating devices with particular organizations when they are purchased/claimed and implemented by the organizations (for example, the claiming may be performed at least in part by populating the devices database 260 and the organizations database 264 with appropriate information when the devices are associated with an organization), receiving data from the various devices (for example, and storing the data in the devices database 260 or other appropriate database), sending data to various devices (for example, sending and/or syncing configurations stored in the configurations data 262 to/with various devices), and/or the like.

In operation, the weather database 258 may store weather information that may include one or more of irradiance information, temperature information, humidity information, precipitation information, air quality index (AQI), and the like. In operation, the management server 150 can communicate, for example, wirelessly via the network 130, with the data sources 140 to update the weather database 258. Weather information stored in the weather database 258 may come from the data sources 140 via the network 130. In some implementations, the management server 150 may not include a weather database 258, and may instead access external data sources for weather information. Additionally or alternatively, the management server 150 can communicate with the object tracking device(s) 110 to collect weather-related data such as, including, but not limited to, temperature, precipitation, humidity, solar irradiance, and the like. The weather database 258 may be updated periodically or non-periodically. The weather information stored in the weather database 258 may include current or historical data points.

In various embodiments, the data stored in the weather database 258 can be sorted using various types of filters including, but not limited, geographical locations, time of the year, and the like.

In various embodiments, the data stored in the weather database 258 can be stored for a predetermined period of time before removed or written over.

In operation, the devices database 260 may store information regarding the object tracking devices 110 and/or additional devices 120, and various relationships and associations among these devices. This information may include identifiers associated with these devices, data received from these devices, etc.

In operation, the configurations database 262 may store information regarding configurations of the object tracking devices 110 or the additional devices 120. The information stored in the configuration database 262 may include configuration information associated with the object tracking devices 110 or organizations associated with the object tracking devices 110. The configuration information may include various network settings, power generation settings, power consumption settings, network communication settings, and the like as described herein.

In operation, the organizations database 264 may store information regarding the organizations to which the object tracking devices 110 or additional devices 120 belong. In various embodiments, different configurations from the configurations database 262 may be applied for the object tracking devices 110 or the additional devices 120 based at least in part on the organization the object tracking devices 110 or additional devices 120 belong.

In operation, the locations database 266 can include location information associated with various locations associated with the object tracking devices 110. For example, the location information can include longitudinal and latitudinal information associated with the object tracking devices 110. In some embodiments, the location information can be associated the location of the object tracking devices 110 within a map tile of a grid. In various embodiments, the location information can be associated with corresponding weather information stored in the weather database 258.

In various embodiments, the management server 150 may include various other modules, components, engines, etc. to provide the functionality as described herein. It will be appreciated that additional components, not shown, may also be part of the management server 150 and, in certain embodiments, fewer components than that shown in FIG. 2 may also be used in the management server 150. For example, the management server 150 may include a security module used to manage cryptographic keys, certificates, and/or other data associated with establishing secure communication with various other devices. For example, the devices database 260 may include an identifier of each device (for example, a serial number), a secret to be used to establish a secure communication with the devices of the same organization, and/or a mechanism to authenticate the devices' identity (for example, the public key of a private public key pair, the private key of which was embedded or stored in the device during the manufacturing, etc.).

Example Object Tracking Device

Figure 3:
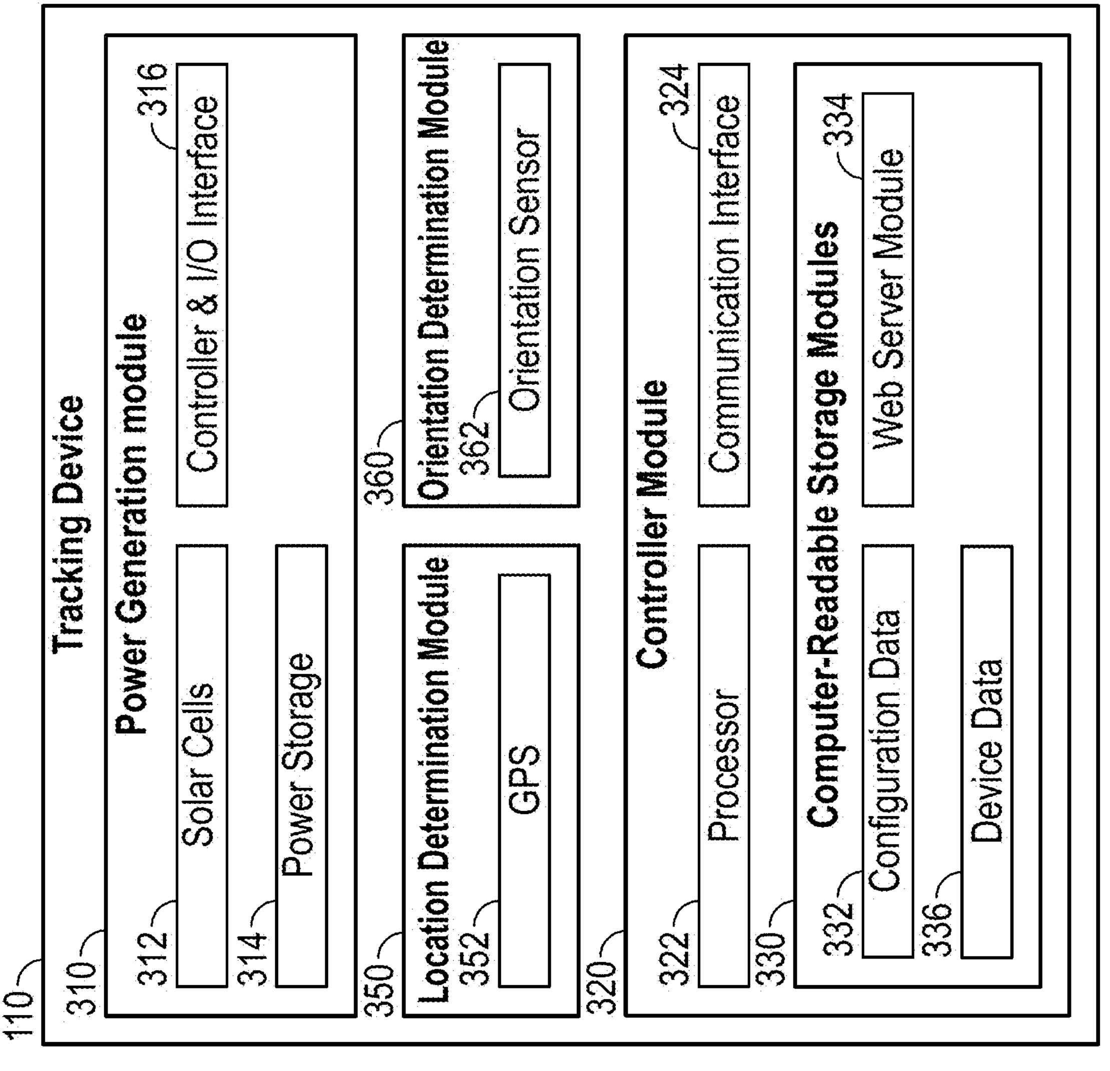
FIG. 3 illustrates a block diagram including an example implementation of an object tracking device, according to various embodiments of the present disclosure.

FIG. 3 illustrates a block diagram of an example object tracking device 110, according to various embodiments of the present disclosure. Object tracking device 110 may comprise one or more power generation modules 310, one or more location determination modules 350, one or more orientation determination modules 360, and one or more controller modules 320. In various implementations, the power generation module 310, the location determination module 350, the orientation determination module 360, and the controller module 320 may be housed in different housings, and/or may be housed in a same housing. In various implementations, the various components and functionality of the object tracking device 110 (including the components and functionality of the power generation module 310, the location determination module 350, the orientation determination module 360, and the controller module 320) described herein may be combined, separated, or re-organized.

The power generation module 310 may include one or more solar cells 312 (and/or other similar solar power generation device(s)), one or more of power storage devices 314, and an optional controller and input/output (I/O) interface 316. In various implementations one or more buses, interconnects, wires/cables, etc. may be used to interconnect the various components of the power generation module 310, for example, the solar cells 312, the power storage devices 314, and the like.

In operation, the solar cells 312 may, when exposed to light, e.g., sunlight, generate electricity using photovoltaic (PV) effect. The solar cells 312 may include, but not limited to, one or more of Amorphous Silicon solar cell (a-Si), Biohybrid solar cell, Cadmium telluride solar cell (CdTe), Concentrated PV cell (CVP and HCVP), Copper indium gallium selenide solar cells (CI (G) S), Crystalline silicon solar cell (c-Si), Float-zone silicon, Dye-sensitized solar cell (DSSC), Gallium arsenide germanium solar cell (GaAs), Hybrid solar cell, Luminescent solar concentrator cell (LSC), Micromorph (tandem-cell using a-Si/uc-Si), Monocrystalline solar cell (mono-Si), Multi-junction solar cell (MJ), Nanocrystal solar cell, Organic solar cell (OPV), Perovskite solar cell, Photoelectrochemical cell (PEC), Plasmonic solar cell, Polycrystalline solar cell (multi-Si), Quantum dot solar cell, Solid-state solar cell, Thin-film solar cell (TFSC), Wafer solar cell (or wafer-based solar cell crystalline), Non-concentrated heterogeneous PV cell, and the like. In various implementations one or more buses, interconnects, wires/cables, etc. may be used to interconnect the solar cells 312 to various components of the power generation module 310.

The solar cells 312 may be integrated (for example, within the same housing) or not integrated (for example, not within the same housing) with other components of the object tracking device(s) 110 or power generation module 310, for example, the one or more power storages 314 and the optional controller and I/O interface 316. In various embodiments, the solar cells 312 can be separated from other components of the object tracking device(s) 110 or the power generation module 310 such that the orientations of the solar cells 312 can be modified without changing the orientations of the object tracking device(s) 110 or that of the power generation module 310. In some embodiments, the solar cell(s) 312 may form a part of a housing for the power generation module 310 or the object tracking device 110.

In various embodiments, the electricity generated by the solar cells 312 can be used to power various components of the power generation module 310 or the object tracking device(s) 110. In some embodiments, the electricity generated by the solar cells 312 may be stored in the power storage 314, which power storage 314 may then provide power to various components of the object tracking devices 110.

In operation, the power storage devices 314 may store electricity generated by the solar cells 312. The power storage device 314 may be a battery. The power storage devices 314 can be integrated or not integrated with other components of the power generation module 310 or the object tracking device(s) 110. In various implementations one or more buses, interconnects, wires/cables, etc. may be used to interconnect the power storage device(s) 314 with the various components of the power generation module 310.

The optional controller and I/O interface 316 may comprise hardware and/or software components that may provide control of the solar cells(s) 312 and/or power storage device(s) 314, and may further provide for communication of power generation data. In various implementations, the controller and I/O interface 316 may provide communication between the power generation module 310 and the controller module 320. Alternatively, the solar cell(s) 312 and/or the power storage device(s) 314 may be integrated with the controller module 320 and may communicate directly with various components of the controller module 320.

In operation, the power generation module 310 may continuously or intermittently monitor status information of the power storage device 314. The status information of the power storage device 314 may include voltage, charge rate, discharge rate, storage capacity, depth of discharge, battery efficiency, discharge current, number of charging cycles, and the like. Monitoring such parameters may allow the object tracking device 110 or the management server 150 to monitor the health of the power storage device 314 over time. In various embodiments, the voltage of the power storage device 314 may be used to determine estimated operation time of the object tracking device 110. In some embodiments, the status information of the power storage device 314 alone may not be sufficient to determine estimated operation time of the object tracking device 110. In such embodiments, power generation and power consumption of the object tracking device 110 may be used in with the status information to determine the estimated operation time.

The controller module 320 may include one or more processors 322, one or more communication interfaces 324, and one or more computer readable storage mediums 330, each of which may be in communication with one another. The computer readable storage medium(s) 330 may include configurations data 332, one or more web server module(s) 334, and devices data 336. The configurations data 332 and the device data 336 may be stored in one or more databases of the controller module 320, or may be stored on virtualization mediums in the cloud. In various implementations one or more buses, interconnects, wires/cables, etc. may be used to interconnect the various components of the controller module 320, and of the object tracking device 110 more generally.

In operation, the one or more of the communication interfaces 324, one or more processors 322, and one or more computer readable storage mediums 330 communicate with one another to, for example, execute by the processor(s) 322 computer program instructions (for example, as provided by the configurations data 332, the web server module(s) 334, or the device data 336); receive, access, and transmit data (for example, to/from the configurations data 332 or devices data 336, via the communication interface(s) 324); and/or the like. In general, the controller module 320, in connection with the power generation module 310, enables the functionality of the object tracking device 110 as described herein. Further implementation details are described below.

In operation, the communication interface(s) 324 may provide wired and/or wireless communications with other devices and networks, as described herein. In various embodiments, communications among the various components of the example operating environment 100 may be accomplished via any suitable means. For example, the object tracking device(s) 110 may communicate with one another, the additional device(s) 120, the management server 150, and/or the user device(s) 160 via the network 130 or any other communications means or method (for example, Bluetooth, WiFi, infrared, cellular, etc.). Accordingly, the communications interface(s) 324 may include one or more of wired and wireless transceivers, such as a Joint Test Action Group (JTAG) transceiver, a Bluetooth or Bluetooth Low Energy (LE) transceiver, an IEEE 802.11 transceiver, an Ethernet transceiver, a USB transceiver, a Thunderbolt transceiver, an infrared transceiver, a wireless cellular telephony transceiver (for example, 2G, 3G, 4G, 5G), or the like. As noted herein, the communications interface(s) 324 may further include one or more application programming interfaces ("APIs").

In operation, the configuration data 332 includes one or more configurations that configure operation of the object tracking device 110, as described herein. For example, such configurations may be received from a user via the user device(s) 160 or the management server 150 (other devices in communication with the object tracking device 110). Each of the configurations stored in the configuration data 332 may include power consumption information associated with the object tracking device 110, data collection frequency (for example, frequency of collecting the location information associated with the object tracking device 110), data transmission frequency (for example, transmission of the location information between the object tracking device 110 and the management server 150), location determination frequency, an amount of power consumption per data transmission, for example, between the object tracking device 110 and the management server 150, network connectivity information, and the like. The object tracking device 110 may store multiple configurations in the configuration data 332, which may be selectively run or implemented, for example, via user selection via the management server 150 or the user device(s) 160.

In operation, the web server module(s) 334 may include program code executable, for example, by the processor(s) 322 to provide a web-based access (for example, interactive graphical user interfaces accessible via web-based communications protocols, rendering of interactive graphical user interfaces written in web-based languages by web-based browsers, etc.) to the object tracking device 110, for example, to configure the object tracking device 110 and/or access data of the object tracking device 110, as further described herein. Such web-based access may be via one or more communications protocols, for example, TCP/IP, UDP, WebRTC, etc., and may include one or more secure communications/cryptographic protocols, for example, TLS, SSL, etc., and may further be provided via communications interface(s) 324. This may include, for example, generating user interface data useable for rendering the various interactive user interfaces described. The user interface data may be used by various computer systems, devices, and/or software programs (for example, a browser program of a user device 160), to render the interactive user interfaces. The interactive user interfaces may be displayed on, for example, electronic displays (including, for example, touch-enabled displays). In various implementations one or more of the management server 150 and the user device(s) 160 may communicate with the object tracking device 110 via one or more of the web server module(s) 334.

The location determination module 350 may include one or more location determination devices 352 (e.g., global positioning system (GPS) devices, GLONASS devices, and/or the like). The location determination device 352 may determine location of the object tracking device 110 and generate location information associated with the location of the object tracking device 110. The location information may include latitudinal or longitudinal, or otherwise geographical positional, data that may represent the location of the object tracking device 110. Additionally or alternatively, the location information may identify a map tile within a grid for identifying or estimating the location of the object tracking device 110.

In various embodiments, the location determination module 350 may determine expected locations of the object tracking device(s) 110 based at least in part on historical location information associated with the object tracking device(s) 110. The historical location information may include previous locations associated with the object tracking device(s) 110 in an earlier predetermined period of time (for example, one day, 12 hours, two hours, one hour, 30 minutes, 10 minutes, 5 minutes, and the like).

In some embodiments, the location determination module 350 may determine anticipated locations of the object tracking device(s) 110 based at least in part on current transit data, which may include, for example, starting location, final destination, expected duration of transit, expected number of stops, expected total transit time, expected total transit distance, average distance covered per day, and the like.

The orientation determination module 360 may include one or more orientation sensor(s) 362. The orientation sensor(s) 362 may be used to gather orientation information to estimate the orientation of the object tracking device 110, for example, with respect to the direction of gravity. The orientation information include at least one of: acceleration, angular velocity, magnetic field, and the like. In various embodiments, the orientation sensor(s) 362 may, for example, include one or more of accelerometers, gyroscopes, magnetometers, inertial measurement units (IMUs), electromechanical tilt sensors, or any combination of aforementioned sensors.

In operation, the orientation of the object tracking device 110 may be used to determine orientation of the object tracking device 110. The orientation of the object tracking device 110 can be used to determine or estimate the orientation of the solar cell(s) 312. Determining or estimating the orientation of the solar cell(s) can advantageously allow the management server 150 to better estimate the amount of sunlight arriving at the solar cell(s) 312 because the orientation of the solar cell(s) 312 would affect the angle of incidence of the sunlight with respect to the surface of the solar cell(s) 312. Depending on the angle of incidence, the amount of electricity generated by the solar cell(s) 312 can vary. Accordingly, the orientation information associated with the object tracking device 110 or the solar cell(s) 312 can advantageously allow the management server 150 to estimate the amount of electricity generated by the solar cell(s) 312.

As described herein, location information, orientation information, or configuration information may be communicated, for example, via the communications interface(s) 324, to other devices, such as the management server 150 and/or user device(s) 160. For example, the object tracking device 110 may be configured to reliably and securely communicate data and to transmit the data to the management server 150 regardless of whether the connectivity of the object tracking device 110 (for example, to the management server 150) is intermittent. For example, data may be stored by the object tracking device 110 until connectivity is available, and may then by transmitted to the management server 150. In another example, data may be stored by the object tracking device 110 for a predetermined duration, and may then be transmitted periodically or non-periodically to the management server 150. In some implementations, the object tracking device may aggregate and/or compress data, and may then send the aggregated and/or compressed data to the management server 150 to save network bandwidth and/or energy on the device.

In various implementations, as described above, the object tracking device(s) 110 may communicate with one or more additional devices 120, which may include, for example, various components of a manufacturing line or process, sensors, etc. Communications with additional device(s) 120 may be via direct (for example, not via a network) wired and/or wireless communications, and/or may be via a network (for example, network 130) wired and/or wireless communications.

In various embodiments, the object tracking device 110, may include various other modules, components, etc. to provide the functionality as described herein. It will be appreciated that additional components, not shown, may also be part of the object tracking device 110, and, in certain embodiments, fewer components than that shown in FIG. 3 may also be used in the object tracking device 110.

In various embodiments, firmware of the object tracking device 110 may be updated such that the object tracking device 110 may provide additional functionality. Such firmware updating may be accomplished, for example, via communications with the management server 150, thereby enabling updating of multiple object tracking device 110 remotely and centrally.

Example Additional Devices

Referring again to FIG. 1, additional device(s) 120 may include, for example, various sensors associated with storage units associated the object tracking device(s) 110. For example, additional device(s) 120 may temperature information, access information, and/or visual information associated with the storage units (for example, to indicate that a door of the storage unit has been opened without authorization, to adjust the inside temperature of the storage unit, to indicate presence of vibration or change in level for the storage unit, to actuate or operate a cooling or heating system of the storage unit, to indicate that the storage unit is empty or full, etc.). In some embodiments, the additional device(s) may provide object tracking device(s) 110 with information that may be used by the object tracking device(s) 110 and/or provided by the object tracking device(s) 110 to the management server 150, and/or the like.

In various embodiments, the additional device(s) 120 include one or more temperature sensors that can measure temperature inside a storage unit and generate temperature data associated with the measured temperature. In some embodiments, the additional device(s) 120 further include one or more sensors that can detect operation of one or more doors of a storage unit. For example, the sensors may be able to detect opening or closing of the one or more doors of the storage unit. In some embodiments, the additional device(s) 120 include one or more level sensors that can detect the level of a storage unit and generate data associated with the measured level. The level sensors may be able to indicate whether the storage unit is level. In some embodiments, the additional device(s) 120 include one or more vibration sensors that can detect/measure vibration of a storage unit and generate vibration data associated with the detected/measured vibration.

Additional non-limiting examples of additional device(s) 120 include machine/systems I/O (for example, relays, contacts, valves, flow, etc.), and the like.

As described herein, additional device(s) 120 may be communicated with or configured via the object tracking device(s) 110. Communications with the additional device(s) 120 may also be accomplished via intermediate communications with existing or legacy devices. Additionally or alternatively, additional device(s) 120 may be communicated with and/or configured via communication with user device(s) 160 or the management server 150.

Data and information gathered from the additional device(s) 120 may be provided to the management server 150, for example, via the object tracking device(s) 110 and/or directly (for example, via a network). The data and information gathered from the additional device(s) 120 may be storage within a non-transitory storage unit of the object tracking device(s) 110 and may be transmitted to the management server 150, for example, via the network 130, periodically or non-periodically.

In various implementations, one or more of, or a combination of, the object tracking device(s) 110 or the management server 150 may provide an application programming interface ("API") by which communications may be accomplished with the additional device(s) 120. In some implementations, an additional "gateway" device may act as an intermediary between the object tracking device 110 and the management server 150, or alternatively as an intermediary between the additional device(s) 150 and the object tracking device 110.

Example Object Tracking Device Functionality

Figure 4:
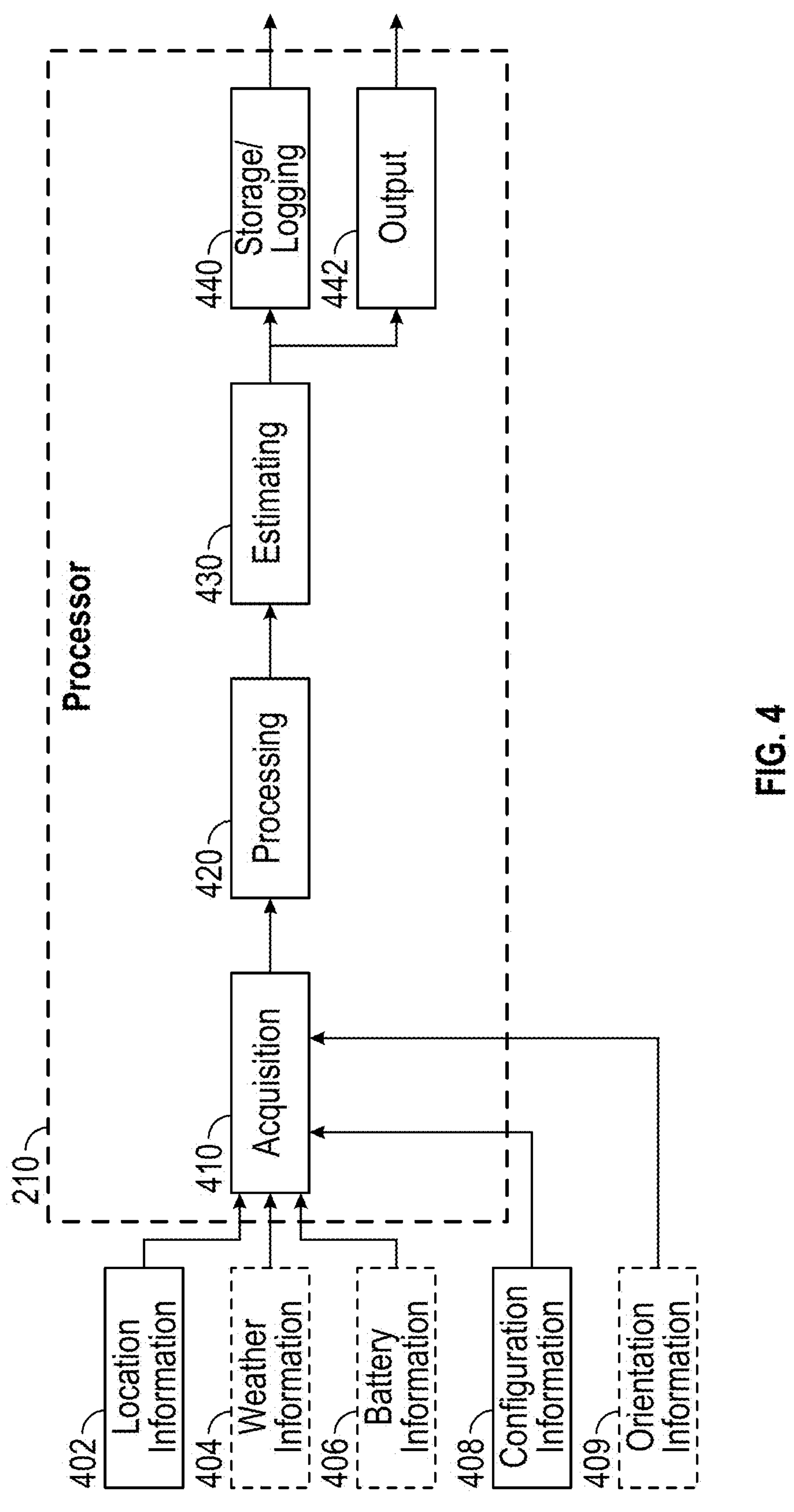
FIG. 4 illustrates a block diagram of an example operation of a management server, according to various embodiments of the present disclosure.

FIG. 4 illustrates a block diagram of an example processor 210 of the management server 150, according to various embodiments of the present disclosure. In particular, FIG. 4 illustrates certain example functional blocks of the processor 210, according to various embodiments.

In operation, the management server 150 may receive location information 402 from the object tracking device 110 (e.g., as provided by the location determination module 350). As described herein, the location information 402 may include data acquired by the location determination device 352. As described herein, such location information 402 may be used to determine the location of the object tracking device 110. The location information 402 may include information related to current location, historical locations, or both.

Additionally or optionally, the management server 150 may receive weather information 404, for example, from the weather database 258 of the management server 150 or the data sources 140, for example, via the network 130. As described herein, the weather information 404 may include data associated with at least one of, but not limited to, temperature, precipitation, humidity, solar irradiance, AQI, and the like. Such weather information 404 may be acquired by the management server 150 at the acquisition block 410. In various embodiments, the management server 150 may receive/identify/access the weather information 404 based at least in part on the location information 402 received, for example, from the location determination module 350 of the object tracking device 110. For example, the management server 150 may determine that the location information 402 indicates that the object tracking device 110 is located in Tucson, AZ. The management server 150 may then retrieve or receive weather information 404 associated with the Tucson, AZ.

Additionally or optionally, the management server 150 may receive battery information 406 from the object tracking device 110 (e.g., as provided by the power generation module 310). As described herein, the battery information 406 may include charge level of the power storage device 314. Such battery information 406 may be acquired by the management server 150 at acquisition block 410. As described herein, the battery information 406 may include at least one or more of: voltage, charge level, charge rate, discharge rate, storage capacity, depth of discharge, battery efficiency, discharge current, number of charging cycles, and the like. In operation, the management server 150 may receive configuration information 408 from the object tracking device 110 (e.g., as stored on the management server 150 or as provided from the configuration data 332). As described herein, the configuration information 408 may include power consumption information associated with the object tracking device 110, data collection frequency (for example, frequency of collecting the location information associated with the object tracking device 110), data transmission frequency (for example, transmission of the location information between the object tracking device 110 and the management server 150), location determination frequency, an amount of power consumption per data transmission, for example, between the object tracking device 110 and the management server 150, network connectivity information, and the like.

Additionally or optionally, the management server 150 may receive orientation information 409 from the object tracking device 110 (e.g., as provided by the orientation determination module 360). The orientation information 409 may include absolute orientation data or relative orientation data of the object tracking device 110. The absolute orientation data may indicate the orientation of the object tracking device 110 with respect to, for example, the direction of gravity. The relative orientation data may indicate the orientation of the object tracking device 110 with respect to, for example, a storage unit associated with the object tracking device 110.

In some embodiments, the orientation information 409 of the object tracking device 110 and/or the solar cell(s) 316 may indicate, for example, angular position, tilt angle, and the like, of the object tracking device 110 and/or the solar cell(s) 316. In some embodiments, the angular position and/or tilt angle of the solar cell(s) 316 may be compared to the angle of incidence of the sunlight (that is, angle at which the sunlight reaches the earth's surface with respect to horizontal surface of the earth) and/or azimuth angle (that is, horizontal rotation angle of the sun) of the sun. Based at least in part on the comparison between the angular position and/or tilt angle of the solar cell(s) 316 and the angle of incidence and/or azimuth angle of the sun may be used to estimate the amount of sunlight reaching the solar cell(s) 316.

In some embodiments, the management server 150 may receive information described here, for example, the location information 402, the weather information 404, the battery information 406, the configuration information 408, and the orientation information 409, from the object tracking device 110 periodically, non-periodically, intermittently, regularly, non-regularly, or the like. Each transmission, for example, of the location information 402, between the management server 150 and the object tracking device 110 may be associated with a certain amount of energy consumed by the object tracking device 110. The energy consumed by the object tracking device 110 per transmission may vary depending on various factors including, but not limited to, size of the data transmitted, amount of data processing performed on the data transmitted, network connectivity, network data transmissibility, and the like.

At block 420, the management server 150 may use the information gathered at the acquisition block 410 to determine, for example, power generation and power consumption associated with the object tracking device 110.

Example Embodiments of Determining Power Generation

In operation, the management server 150 may use the location information 402 to determine the power generation associated with the object tracking device 110. Additionally or optionally, the management server 150 may use the weather information 404 in conjunction with the location information 402 determine the power generation associated with the object tracking device 110. In some embodiments, the management server 150 may receive/identify/access the weather information 404 based at least in part on the location information 402. In some embodiments, relevant weather information may be identified from the weather information 404 based at least in part on the location information 402. As described herein, the weather information 404 may include data associated with, for example, solar irradiance, precipitation, humidity, temperature, AQI, and the like. Such data may be used to determine or estimate the amount of sunlight reaching the solar cell(s) 316 of the object tracking device 110.

In operation, higher solar irradiance may result in greater amount of sunlight reaching the solar cell(s) 316. In some examples, high humidity and high temperature may result reduction in solar cell efficiency. In some examples, poor air quality, for example, low AQI, can negatively impact the amount of sunlight reaching the solar cell(s) 316. Once the processor 210 of the management server 150 determines the amount of sunlight reaching the solar cell(s) 316, it may in turn determine or estimate the amount electricity generated by the solar cell(s) 316. The amount of electricity generated by the solar cell(s) 316 may represent the amount of electricity generated at a given time or the amount of electricity to be generated in the future. As described herein, the weather information 404 may include forecasted weather information associated with different locations. Therefore, the management server 150 may use the weather information 404 to predict how much electricity will be generated by the solar cell(s) 316 at a given location, at a given time of the year.

Additionally or optionally, the management server 150 may use the orientation information 409 to determine or estimate the amount of electricity generated by the solar cell(s) 316. As described herein, the angle of incidence for the sunlight reaching the solar cell(s) 316 can affect the amount of electricity generated by the solar cell(s) 316. For example, the closer the angle of incidence is to a tilt angle of the solar cell(s) 316, the amount of electricity generated by the solar cell(s) 316 may increase. In contrast, the farther the angle of incidence is from 90 degrees, the amount of electricity generated by the solar cell(s) 316 may decrease.

In some embodiments, the management server 150 may determine the power generation associated with the object tracking device 110 using the weather information 404, as described herein. For example, a storage unit associated with the object tracking device 110 may be located in Palm Springs, California. To forecast the amount of the power generated by the object tracking device 110, for example, via the solar cell(s) 316, the management server 150 may retrieve the weather information 404 including associated with Palm Springs, California. Additionally, the management server 150 may forecast the amount of power generated based at least in part on historical weather information. For example, the management server 150 may receive/retrieve weather information 404 related to the months between January and June to forecast the amount of power generated, for example, in Palm Springs, California.

In various embodiments, a storage unit associated with the object tracking device 110 may be in transit. In such situations, power generation of the object tracking device 110 may need to be determined or forecasted for anticipated locations of the object tracking device 110. The management server 150 may determine the anticipated locations from a transit route. Based at least in part on the transit route, the management server 150 can receive the weather information 404 associated with various locations along the transit route to calculate the amount of power generated by the object tracking device 110 during transit. In some embodiments, the anticipated locations may be determined from previous locations associated with the object tracking device 110 in an earlier predetermined period of time.

In various embodiments, the processor 210 of the management server 150 and/or the object tracking device 110 may, when determining the power generation of the object tracking device 110, consider that the power generation module 310 may generate and store electricity via the solar cell(s) 312 when certain conditions are satisfied. For example, the solar cell(s) 316 may require a predetermined amount of energy (for example, certain amount of voltage present at the solar cell(s) 312) prior to generating electricity. As such, generating electricity via the solar cell(s) 316 prior to the solar cell(s) 316 reaching a certain voltage level may result in the object tracking device 110 unnecessarily consuming electricity prior to generating electricity. Accordingly, when determining estimated power generation, the management server 150 and/or the object tracking device 110 may additionally determine whether the amount of sunlight reaching the solar cell(s) 312 can generate enough electricity to allow the voltage level, for example, of the solar cell(s) 312 to exceed a predetermined voltage threshold. In some embodiments, the predetermined voltage threshold for the solar cell(s) 312 may be configurable by users or organizations, for example, via the user device(s) 160.

In various embodiments, the power generation module 310 may be programmed to not generate electricity using the solar cell(s) 316 unless a voltage threshold condition, for example, voltage present at the solar cell(s) 312, is satisfied. In some embodiments, the power generation module 310 may include one or more diodes, for example, current regulating diodes, that regulate current generated by the solar cell(s) 312.

In various embodiments, the power generation module 310 may have the solar cell(s) 312 connected to/disconnected from other components of the power generation module 310 to control when to generate electricity. For example, it may not be beneficial to have the solar cell(s) 312 connected to other components of the power generation module 310, for example, the power storage device 314, during at night or otherwise when there is insufficient amount of sunlight to generate more electricity than consumed (to operate the solar cell(s) 312). As discussed herein, such connection/disconnection of the solar cell(s) 312 may be based at least in part on voltage of the solar cell(s) 312, which can be used as an indicator as to whether there is sufficient amount of sunlight reaching the solar cell(s) 312 to generate more electricity than electricity consumed. For example, if the voltage of the solar cell(s) 312 satisfy a condition, the solar cell(s) 312 may remain connected to the other components of the power generation module 310. In contrast, if the voltage of the solar cell(s) 312 does not satisfy the condition, the solar cell(s) 312 may be disconnected from the other components of the power generation module 310.

However, it is contemplated that when the solar cell(s) 312 are disconnected, the voltage of the solar cell(s) 312 may temporarily spike. Such spike can trigger the power generation module 310 to reconnect the solar cell(s) 312, thereby allowing the solar cell(s) 312 to generate electricity. In order to prevent such spike causing accidental reconnect of the solar cell(s) 312, the solar cell(s) 312 may be disconnected when its voltage level is a certain level below a threshold level.

Example Embodiments of Determining Power Consumption

In operation, the management server 150 may use the configuration information 408 to calculate the power consumption of the object tracking device 110. As described herein, the configuration information 408 may include at least one of power consumption information associated with the object tracking device 110, a frequency of data transmission between the object tracking device 110 and the computer system, an amount of power consumption per data transmission between the object tracking device 110 and the computer system, a frequency of determining the location of the object tracking device 110, or network connectivity information.

As described herein, the object tracking device 110 may intermittently, for example, at a predetermined frequency, or continuously communicate with the management server 150 to transmit information between the object tracking device 110 and the management server 150. Each of the transmission may be associated with a predetermined amount of power consumption, which can be used to determine or estimate power consumption associated with the object tracking device 110.

Additionally, as described herein, the object tracking device 110 may collect information from a storage unit associated with the object tracking device 110. Such collection of information can be associated with a known, predetermined level of power consumption. By determining the frequency of collecting information from the storage unit and the amount of power consumption associated with each collection of information, power consumption associated with collection of information associate with a storage unit associated with the object tracking device 110 can further be ascertained.

In some embodiments, the predetermined amount of power consumption per collection of information from the storage unit can depend on various factors including, but not limited to, size of the collected information, format of the collected information, network connectivity, network data transmissibility, and the like. The configuration information 408 may include information related to the amount of power consumption per collection of information from the storage unit based at least in part on, for example, size of the collected information, format of the collected information, method of data collection (for example, wired or wireless), and the like, as described herein. Such information (for example, amount of power consumption per collection of information from the storage unit) may be the same or vary at least based in part on the object tracking device(s) 110, organization associated with the object tracking device(s) 110, sensors associated with the storage unit, and the like.

Additionally, as described herein, the management server 150 may collect or generate location information associated with the location of the object tracking device 110 (e.g., via the location determination module 350). Such collection of location information can be associated with a known, predetermined level of power consumption. By determining the frequency of collecting location information associated with the location of the object tracking device 110 and the amount of power consumption associated with each collection of location information, power consumption associated with determination of the location of the object tracking device 110 can further be ascertained.

Additionally, as described herein, the orientation determination module 360 may collect or generate orientation information associated with the orientation of the object tracking device 110. Such collection of orientation information can be associated with a known, predetermined level of power consumption. By determining the frequency of collecting orientation information associated with the location of the object tracking device 110 and the amount of power consumption associated with each collection of orientation information, power consumption associated with determination of the orientation of the object tracking device 110 can further be ascertained.

In some implementations, the management server 150 may also use network connectivity information to determine power consumption of the object tracking device 110.

The network connectivity information may, for example, include at least one of distance to a nearest signal or cell tower, data transmissibility, signal strength, or data availability. For example, the distance between the object tracking device 110 to the nearest signal or cell tower can positively or negatively impact the energy consumed per connection with the signal or cell tower.

Example Method of Determining Estimated Operation Time

At block 430, the management server 150 may use the power generation and the power consumption associated with the object tracking device 110 to determine the estimated operation time for the object tracking device 110.

As discussed herein, the object tracking devices 110 often are positioned on or installed on a storage unit, for example, a trailer, and do not include an external power source. Therefore, to ensure continued availability of the object tracking devices 110, it is important to estimate and forecast expected operation time for the object tracking devices 110 and, when necessary, to take adequate measures, for example, providing updated configuration for the object tracking device 110.

The power generation and the power consumption of the object tracking device(s) 110 may indicate the amount of power generated and the amount of power consumed per unit time, respectively. By comparing the power generation and the power consumption of the object tracking device(s) 110, the processor 210 of the management server 150 may determine if the object tracking device 110 is generating more power (for example, electricity) than consumed, consuming more power than generated, or consuming and generating substantially the same amount of power.

Additionally or optionally, the management server 150, in some embodiments, receives the battery information 406 as described herein, and use the battery information 406 with the power generation and the power consumption to determine the estimated operation time. As described herein, the power consumption and the power generation may be used to determine net power consumed/generated by the object tracking device 110. The net power consume/generated may be in a unit of amount of energy per second, per minute, per hour, per day, per week, and the like. By using the net power consumed by the object tracking device 110, for example, per day, and the battery information 406 indicating, for example, current charge level of the object tracking device 110, the management server 150 may determine how long it would take for the charge level of the object tracking device 110 to reach zero or a predetermined threshold charge level. The predetermined threshold charge level may indicate that the object tracking device 110 may run out of power in, for example, next day or two, next week or two, and the like.

In some embodiments, the power generation and the power consumption may represent expected amount of power (for example, electricity) generated and consumed by the object tracking device 110 in, for example, next one month, next six months, next 12 months, until the end of calendar year, and the like). In this regard, the processor 210 of the management server 150 can compare the expected total amount of power generated by the object tracking device 110 with the expected total amount of power consumed by the object tracking device 110. Such comparison may allow users to forecast whether their object tracking devices 110 may remain operational after a certain period of time.

For example, users may wish to know if the object tracking device 110 will remain operational for the next 12 months. The management server 150 may determine the estimated amount of energy generated by the object tracking device 110 for the next 12 months and also determine the estimated amount of energy consumed by the object tracking device for the next 12 months, as described herein. For example, the estimated amount of energy consumed for the next 12 months may be calculated using at least in part baseline energy consumption by the object tracking device 110, energy consumed per data/information (for example, the location information 402) transmission between the object tracking device 110 and the management server 150, frequency of data/information transmission between the object tracking device 110 and the management server 150. The energy consumed per data/information transmission and the frequency of data/information transmission (which may be indicated by the configuration of the object tracking device) may be used to calculate the total estimated energy consumption associated with data/information transmission. The total estimated energy consumption associated with data/information transmission may be combined with the baseline energy consumption to determine the total estimated power consumption of the object tracking device 110.

Example Output of the Management Server Processor

At block 440, the data associated with the power generation, the power consumption, and the estimated operation time (for example, any or all information associated with the processing and estimating, including, for example, the location information, the weather information, the configuration information, and the orientation information) may be stored or logged by the processor 210 of the management server 150, for example, in a memory/computer readable storage medium. In some implementations, the data associated with the power generation and the power consumption may be stored indefinitely. In some implementations, the data associated with the power generation and the power consumption may be stored for a period of time, for example, rolling based on an acquisition date/time or process data/time, and then deleted. In some implementations, the data associated with the power generation and the power consumption may be stored or not stored, or stored for a period of time, based on an outcome of the processing and estimating. In some implementations, storage of the data associated with the power generation and the power consumption may be based on any combination of the above.

At block 442, the management server 150 may generate an updated configuration data for the object tracking device 110 based at least in part on the estimated operation time, the power consumption, or the power generation. The updated configuration data may be provided to the object tracking device 110 via the network 130. In some embodiments, users may access the updated configuration via the user devices 160 (for example, via the network 130 or the management server 150). The updated configuration data may automatically update configuration of the object tracking device 110. In some embodiments, user may be prompted to apply the updated configuration data to the object tracking device 110, for example, via any combination of the user device 160, the management server 150, and the network 130.

In operation, the updated configuration may adjust at least one of power consumption associated with the object tracking device 110, the frequency of data transmission between the object tracking device 110 and the management server 150 (for example, via the network 130), an amount of power consumption per transmission between the object tracking device 110 and the management server 150, the frequency of determining location of the object tracking device 110 (for example, via the location determination module 350), network connectivity settings, and the like. The management server 150 may continue to determine updated power generation and updated power consumption based at least in part on the information described herein and determine updated estimate operation time as described herein.

Additionally or alternatively, the processor 210 of the management sever 150 can generate and transmit notifications to user device(s) 160 via the network 130. The notification may include, but not limited to, the updated configuration as described herein, request to apply the updated configuration, details of the updated configuration, request to reposition or reorient the object tracking device 110, request to provide an external power supply for the object tracking device 110, and the like. In some embodiments, the notification may include graphical illustrations of forecasted power generation and power consumption of the object tracking device 110.

In various implementations, various aspects of the functionality described in reference to FIG. 4 may be accomplished in substantially real-time, for example, determination of the power generation and the power consumption may be performed as the location information, weather information, orientation information, and configuration information are acquired/received. Alternatively, various aspects of the functionality described in reference to FIG. 4 may be accomplished in batches and/or in parallel.

In various implementations, the functionality described above in reference to FIG. 4 may be provided based on a configuration of the object tracking device 110. For example, the acquisition, processing, estimating, the output, and/or storage/logging functionality may be based on, and changed, according to a configuration of the object tracking device 110 and further described herein.

Further Example Methods and Functionality

Figure 5:
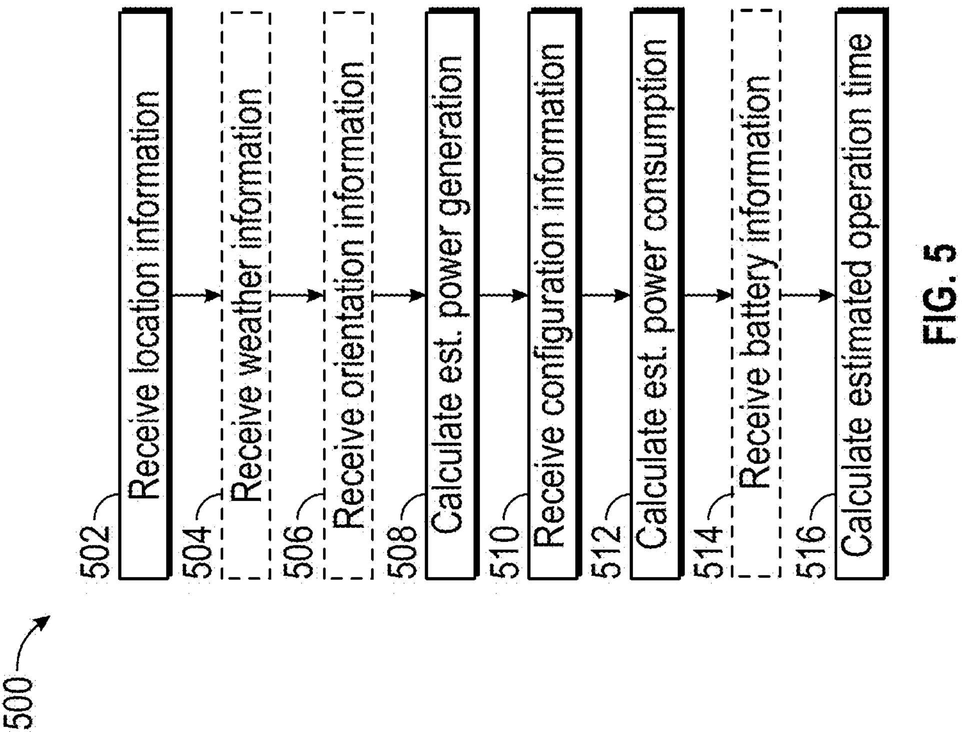
FIGS. 5-6 are flowcharts illustrating example methods and functionality, according to various embodiments of the present disclosure.
Figure 6:
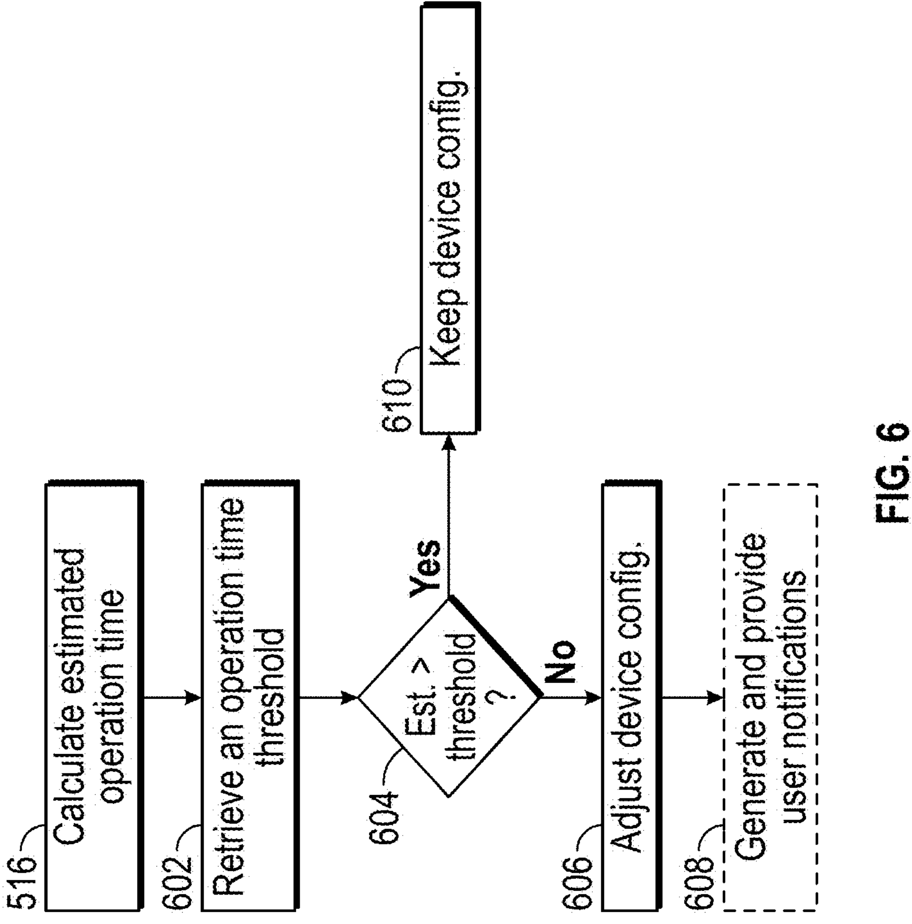

FIGS. 5-6 are flowcharts illustrating example methods and functionality, according to various embodiments of the present disclosure. FIG. 5 is a flowchart illustrating an example method 500 for determining estimated operation life of the object tracking device(s) 110. The example method 500 illustrates functionalities associated primarily with the management server 150. FIG. 6 is a flowchart illustrating an example method for adjusting configuration of the object tracking device(s) 110 based on the estimated operation life of the object tracking device(s) 110. Both the example methods of FIGS. 5 and 6 illustrate functionalities associated primarily with the management server 150.

Referring to FIG. 5, at block 502 the th processor 210 receives/acquires/collects location information, as generally described herein in reference to block 402 of FIG. 4. As described herein, the processor 210 may receive/acquire/collect the location information from the object tracking device 110. The location information may be used to determine the location of the object tracking device 110.

Additionally or optionally, at block 504 the processor 210 receives weather information, as generally described herein in reference to block 404 of FIG. 4. The weather information, for example, may be used to determine the expected/forecasted/present amount of sunlight reaching the solar cells 312(*s*) of the power generation module 310. The processor 210 may receive the weather information from the weather database 258 of the management server 150 or the data sources 140. The weather information, as described herein, may be accessed/received/retrieved based at least in part on the location information.

Additionally or optionally, at block 506 the processor 210 receives orientation information, as generally described herein in reference to block 409 of FIG. 4. The orientation information, for example, may be used to determine the orientation of the object tracking device 110 and/or the orientation of the solar cell(s) 312. In operation, the object tracking device 110 may not be orientated or positioned for the solar cell(s) 312 to receive the optimal/maximum amount of sunlight.

At block 508 the processor 210 of the management server 150 determines power generation of the object tracking device 110, as generally described above in reference to block 420 of FIG. 4. At block 510 the management server 150 may receive/acquire/collect configuration information associated with the object tracking device 110 as generally described above in reference to block 408 of FIG. 4. At block 512, the processor 210 of the management server 150 determines power consumption of the object tracking device 110, as generally described above in reference to block 420 of FIG. 4.

Additionally or optionally, at block 514 the processor 210 of the management server 150 receives battery information, as generally described herein in reference to block 406 of FIG. 4. As described herein, the battery information can include at least one of, but not limited to, voltage, charge level, charge rate, discharge rate, storage capacity, depth of discharge, battery efficiency, discharge current, number of charging cycles, and the like. The battery information may be used to determine status of the power storage device(s) 314 of the power generation module 310. As described herein, since the power storage device(s) 314 may store power for the object tracking device 110, battery information providing the status of the power storage device(s) 314 may advantageously allow the management server 150 to accurately forecast estimated operation time for the object tracking device 110.

At block 516, the processor 210 of the management server 150 may determine estimated operation time, as generally described above in reference to block 430 of FIG. 4. For example, the management server 150 may use the charge level (for example, of the power storage device(s) 314), the power generation, and the power consumption to determine the estimated operation time for the object tracking device 110.

In operation, an object associated with the object tracking device 110 may be in transit. Under such circumstances, the management server 150 may optionally or additional receive location information representative of respective corresponding locations of the object tracking device 110. The location information may be provided from transit information associated with the object in transit. The transit information may be associated with the object tracking device 110 or the organization associated with either the object or the object tracking device 110. The management server 150 may receive the transit information from the data sources 140.

In some embodiments, the transmit information may not be available to the management server 150. In such circumstances, the management server 150 may record locations of the object tracking device 110. Recording of the locations of the object tracking device 110 may be done periodically or non-periodically. For example, the management server 150 may record the locations of the object tracking device 110 at one-minute intervals, 5-minute intervals, 10-minute intervals, 20-minute intervals, 30-minute intervals, one-hour intervals, one-day intervals, and the like. Additionally or alternatively, the management server 150 may record the locations of the object tracking device 110 based on the distance travelled by the object tracking device 110. For example, the management server 150 may record the locations of the object tracking device 110 for every mile travelled, every five miles travelled, every 10 miles travelled, every 20 miles travelled, every 50 miles travelled, and the like. In some embodiments, the management server 150 may record the locations of the object tracking device 110 only it determines that the object tracking device 110 is in transit.

The management server 150, based at least in part on the recorded locations of the object tracking device 110, may determine expected locations of the object tracking device 110. The expected locations of the object tracking device 110 may be used to determine expected power generation of the object tracking device 110 associated with those expected locations. As described herein, based at least on the expected locations, weather information, for example, forecasted weather information associated with the expected locations, can be retrieved and be used to determine the expected power generation.

Referring to FIG. 6, the processor 210 of the management server 150 may, after determining the estimated operation time at block 516, retrieve an operation time threshold at block 602. The operation time threshold may represent a desired period of time of operation for the object track device(s) 110. For example, users or organizations may provide the operation time threshold. The operation time threshold may be stored in/accessed or retrieved from the configurations database 262, the organizations database 264, or configuration data 332. In some embodiments, the operation time threshold may be provide by and configurable by users and/or organizations associated with the object tracking device(s) 110. The operation time threshold may be configurable/adjustable using the user device(s) 160 via the network 130. In operation, the operation time threshold may be, for example, a month, three months, six months, 12 months, perpetuity, and the like.

At block 604, the management server 150 compares the estimated operation time with the operation time threshold. If the estimated operation time satisfies the threshold, the management server 150, at block 610, maintains the configuration of the object tracking device 110. Additionally, the management server 150 does not generate an updated configuration data for the object tracking device 110. In contrast, if the estimated operation time does not satisfy the condition, the management server 150, at block 606, generates an updated configuration data for the object tracking device 110. The updated configuration data, as described herein, may be used to update configuration of the object tracking device 110.

Additionally or optionally, the processor 210 of the management server 150 may, at block 608, generate notification associated with the estimated operation time of the object tracking device 110, current configuration of the object tracking device 110 (that is, configuration prior to updated configuration), or the updated configuration of the object tracking device 110. The notification may include various types of updates and information as described herein. The notification may be transmitted to the user devices 160 via the network 130 or any combination of external and internal wired or wireless communication servers.

Application of Estimated Operation Time

Figure 7:
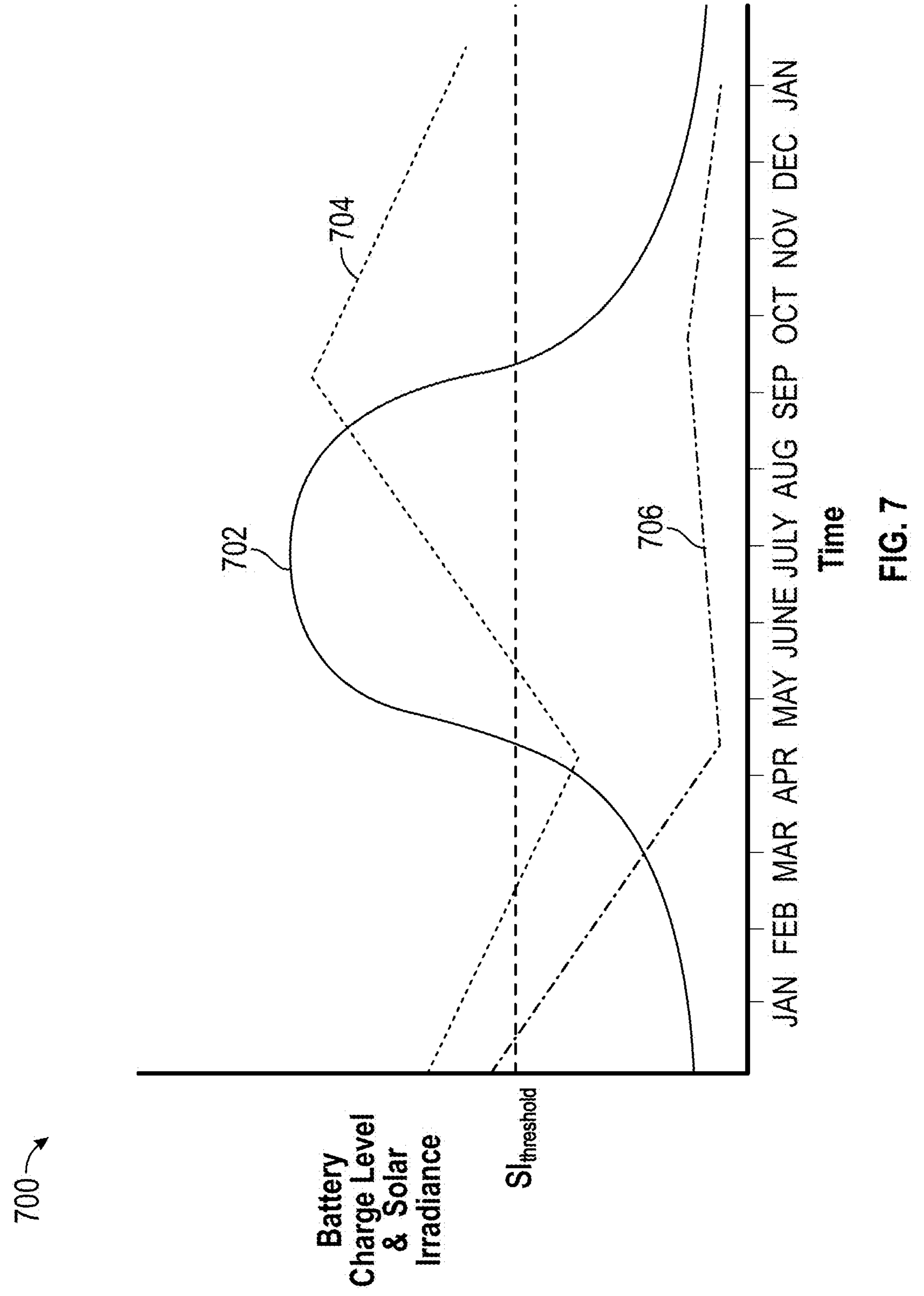
FIG. 7 illustrates an example graph illustrating example voltage levels and solar irradiance levels over a period of time, according to various embodiments of the present disclosure.

FIG. 7 illustrates an example chart 700 showing example graphs of solar irradiance and battery charge levels of an example object tracking device 110. A graph 702 represents an example solar irradiance during an example calendar year. A graph 704 is an example plot representing battery charge levels of an object tracking device 110 with a first configuration. A graph 706 is an example plot representing battery charge levels of an object tracking device 110 with a second configuration. The battery charge level may be a charge level of the power storage device(s) 314.

As described herein, it may be difficult to accurately predict how long object tracking devices 110 can remain operational. In some embodiments, battery status information (for example, voltage, charge rate, discharge rate, storage capacity, depth of discharge, battery efficiency, discharge current, number of charging cycles, and the like associated with the power storage device 314) alone may not be sufficient to accurately predict estimated operation time of the object tracking devices 110. Moreover, different object tracking devices 110 may have different configurations that may lead to different rate of power consumption. Furthermore, there are many factors that affect the amount of electricity generated by the solar cell(s) 312 of the object tracking devices 110.

Accordingly, users of the object tracking devices 110 may be interested to see if the object tracking devices 110 may remain operational for a period of time (for example, a month, six months, a 12 months or a calendar year, or forever). For example, users of the object tracking devices 110 may be interested to see if the object tracking device 110 can remain operational through the months that have relatively shorter days (for example, November through February) because they may be concerned that their object tracking devices 110 do not have sufficient charge prior to those months. In another example, users of the object tracking devices 110 may be interested to see if the object tracking device 110 can remain operation for the next 12 months and if not, adjust orientation of the object tracking devices 110. By comparing the power generation and the power consumption of the object tracking device 110, the management server 150 can provide useful information indicating potential availability of the object tracking devices 110.

As illustrated by the graph 702, the amount of solar irradiance can vary between different seasons. For example, the amount of solar irradiance can decrease during winter months and increase during summer months. Therefore, solar cells can generate more electricity during the summer months than during the winter months. The solar irradiance levels illustrated by the graph 702 may represent moving averages of the solar irradiance over a predetermined period of time (for example, 7 day moving average, 14 day moving average, 1 month moving average, 2 months moving average, and the like). The overall trend of solar irradiance may vary year to year and historical weather information may be used to forecast solar irradiance.

As illustrated by the graphs 704 and 706, the battery charge level of the object tracking device(s) 110 may change between different seasons. In some embodiments, the changes in the battery charge level of the object tracking device(s) 110 may reflect the change in the amount of solar irradiance in different seasons. For example, the charge level of an object tracking device 110 may decrease during the winter months because the solar irradiance may be lower during the winter months. Likewise, the charge level of an object tracking device 110 may increase during the summer months because the solar irradiance may be higher during the summer months. The battery charge levels illustrated by the graphs 704 and 706 may represent moving averages of the battery charge levels over a predetermined period of time (for example, 7 day moving average, 14 day moving average, 1 month moving average, 2 months moving average, and the like).

In operation, the battery charge level (for example, illustrated by the graphs 704 and 706 in FIG. 7) of the object tracking device 110 may decrease when the solar irradiance level is below a threshold value (for example, $SI_{threshold}$) and may increase when the solar irradiance level is above the threshold value. The threshold value, for example, $SI_{threshold}$, may represent the minimum average amount of solar irradiance needed to generate more energy, for example, via the power generation module 310, than energy consumed, for example, by the object tracking device 110.

In various embodiments, it is possible that decrease/increase in solar irradiance may not exactly overlap with decrease/increase in charge level of an object tracking device 110, as shown in FIG. 7. In some embodiments, decrease/increase in charge level of an object tracking device 110 may closely follow decrease/increase in solar irradiance.

The different profiles of the graph 704 and the graph 706 may be due to different configurations of the object tracking device(s) 110. As discussed above, the graph 704 represents battery charge levels of an object tracking device 110 with a first configuration, while the graph 706 represents battery charge levels of an object tracking device 110 with a second configuration. For example, the first configuration may represent a configuration with a first power consumption rate for the object tracking device 110. As illustrated by the graph 704, the battery charge level of the object tracking device 110 with the first power consumption rate decreases during months when solar irradiance is below the threshold (for example, $SI_{threshold}$) and recovers during months when solar irradiance is above the threshold. In contrast, the second configuration may represent a configuration with a second power consumption rate. As illustrated by the graph 706, the battery charge level of the object tracking device 110 with the second power consumption rate decreases rapidly during months when solar irradiance is below the threshold (for example, $SI_{threshold}$) and recovers very little (or, in some embodiments, none at all) during months when solar irradiance is above the threshold. In the example illustrated in FIG. 7, the first power consumption rate of the first configuration may be less than the second power consumption rate of the second configuration.

In various embodiments, the management server 150 may be able to determine the rate at which the battery charge level (for example, charge level of the power storage device(s) 314) of the object tracking device 110 changes. If the rate of change of the battery charge level is above a threshold rate (for example, decreasing too quickly), the management server 150 may automatically (or, in some embodiments, manually with user input via the user device(s) 160) adjust configuration of the object tracking device 110.

In some embodiments, the management server 150 may use the power consumption of the object tracking device 110 to determine whether to change configuration of the object tracking device 110. The power consumption of the object tracking device 110 may be compared to a threshold and the comparison between the power consumption and the threshold may be used to determine whether to change configuration of the object tracking device 110. For example, the management server 150 may determine that the power consumption level is above a predetermined threshold (for example, the object tracking device 110 is spending too much power), and may determine to change configuration of the object tracking device 110, for example, to reduce the power consumption.

In some embodiments, the management server 150 may periodically update battery charge level, forecasted power generation, and forecasted power consumption of the object tracking device 110 to determine whether to change the configuration of the object tracking device 110. The management server 150 may perform such updates and determinations periodically, non-periodically, intermittently, non-intermittently, regularly, irregularly, or whenever the management server 150 receives updated information from the object tracking device 110 (for example, the location information and the configuration information as described here).

LIST OF EXAMPLE NUMBERED EMBODIMENTS

The following is a list of example numbered embodiments. The features recited in the below list of example embodiments can be combined with additional features disclosed herein. Furthermore, additional inventive combinations of features are disclosed herein, which are not specifically recited in the below list of example embodiments and which do not include the same features as the specific embodiments listed below. For sake of brevity, the below list of example embodiments does not identify every inventive aspect of this disclosure. The below list of example embodiments are not intended to identify key features or essential features of any subject matter described herein.

1. A computer system for interacting with an object tracking device, the computer system comprising:
   - a computer readable storage medium having program instructions embodied therewith; and
   - one or more processors configured to execute the program instructions to cause the computer system to:
     - receive, from an object tracking device, location information associated with the object tracking device;
     - determine, based at least in part on the location information, a power generation of the object tracking device;
     - receive, from the object tracking device, configuration information associated with the object tracking device;
     - determine, based at least in part on the configuration information, a power consumption of the object tracking device;
     - determine an estimated operation time based at least in part on the power generation and the power consumption; and
     - in response to determining that the estimated operation time does not satisfy a threshold, determine and transmit, to the object tracking device, updated configuration information for the object tracking device.

2. The computer system of embodiment 1, wherein the one or more processors are configured to execute the program instructions to further cause the computer system to:

receive, from a remote data source, weather information associated with the location information, wherein the determination of the power generation of the object tracking device is further based at least in part on the weather information.

3. The computer system of embodiment 2, wherein the weather information comprises at least one of: irradiance information, temperature information, humidity information, precipitation information, or air quality index.

4. The computer system of embodiment 1, wherein the one or more processors are configured to execute the program instructions to further cause the computer system to:

receive, from the object tracking device, orientation information associated with the object tracking device, wherein the determination of the power generation of the object tracking device is further based at least in part on the orientation information.

5. The computer system of embodiment 4, wherein the orientation information is determined based at least in part on data acquired by one or more sensors of the object tracking device.

6. The computer system of any of embodiments 1 to 5, wherein the one or more processors are configured to execute the program instructions to further cause the computer system to:

receive, from a remote data source, weather information associated with the location information; and receive, from the object tracking device, orientation information associated with the object tracking device, wherein the determination of the power generation of the object tracking device is further based at least in part on the weather information and the orientation information.

7. The computer system of any of embodiments 1 to 6, wherein the computer system further comprises the object tracking device, wherein the object tracking device comprises:

a solar power generation device comprising a solar cell;

a power storage device;

a location determination device configured to generate the location information associated with the object tracking device;

a configuration data storage configured to store the configuration information associated with the object tracking device; and a wireless communication interface configured to establish wireless communications between the object tracking device and the one or more processors.

8. The computer system of embodiment 7, wherein the object tracking device is configured to:

determine the location information associated with the object tracking device via the location determination device;

transmit the location information to the computer system;

access the configuration information associated with the object tracking device; and transmit the configuration information to the computer system.

9. The computer system of any of embodiments 1 to 8, wherein the configuration information comprises at least one of: (1) power consumption information associated with the object tracking device, (2) a frequency of data transmission between the object tracking device and the computer system, (3) an amount of power consumption per data transmission between the object tracking device and the computer system, or (4) network connectivity information.

10. The computer system of any of embodiments 1 to 9, wherein the estimated operation time indicates whether the object tracking device can remain operational for a configurable period of time.

11. The computer system of embodiment 10, wherein the configurable period of time is one year.

12. The computer system of any of embodiments 1 to 11, wherein the updated configuration information comprises an adjustment of at least one of: a frequency of data transmission between the object tracking device and the computer system, an amount of power consumption per data transmission between the object tracking device and the computer system, a frequency of generating the location information associated with the object tracking device, or network connectivity information associated with the object tracking device.

13. The computer system of any of embodiments 1 to 12, wherein the one or more processors are configured to execute the program instructions to further cause the computer system to:

receive object information from the object tracking system, wherein the object information is associated with a storage unit associated with the object tracking system, and wherein the object information comprises at least one or more of: (1) temperature information, (2) access information, or (3) visual information.

14. The computer system of embodiment 13, wherein the object information is collected using a plurality of sensors of the storage unit.

15. The computer system of embodiment 13, wherein the object information is collected at a predetermined time interval, and wherein the object information is stored within a computer-readable storage medium of the object tracking device.

16. The computer system of any of embodiments 1 to 15, wherein the computer system comprises a wireless communication module configured to establish wireless communications with the object tracking device, and wherein the location information, the configuration information, and the updated configuration information are transmitted between the computer system and the object tracking device via the wireless communications.

17. The computer system of any of embodiments 1 to 16, wherein the location information comprises a plurality of position data representative of a corresponding plurality of locations of the object tracking device in a predetermined period of time, and wherein the one or more processors are configured to execute the program instructions to further cause the computer system to:

determine, based at least in part on the plurality of position data, a corresponding plurality of power generation of the object tracking device;

determine an updated estimated operation time based at least in part on the corresponding plurality of power generation and the power consumption.

18. The computer system of any of embodiments 1 to 17, wherein the one or more processors are configured to execute the program instructions to further cause the computer system to:
transmit information associated with the updated configuration information to one or more user devices associated with the object tracking device.

19. The computer system of any of embodiments 1 to 18, wherein, for determination of the estimated operation time, the one or more processors are configured to execute the program instructions to further cause the computer system to:
determine a charge level of the object tracking device;
determine a difference between the power consumption of the object tracking device and the power generation of the object tracking device over a period of time; and
based at least in (1) the charge level of the object tracking device and (2) the difference between the power consumption of the object tracking device and the power generation of the object tracking device over the period of time, determine a time it would take for the charge level of the object tracking device to satisfy a predetermined charge level threshold.

20. A computer system for interacting with an object tracking device, the computer system comprising:
a computer readable storage medium having program instructions embodied therewith; and
one or more processors configured to execute the program instructions to cause the computer system to:
receive, from an object tracking device, location information associated with the object tracking device;
receive, from the object tracking device, orientation information associated with the object tracking device;
determine, based at least in part on the location information and the orientation information, a power generation of the object tracking device;
receive, from the object tracking device, configuration information associated with the object tracking device;
determine, based at least in part on the configuration information, a power consumption of the object tracking device;
determine an estimated operation time based at least in part on the power generation and the power consumption; and
in response to determining that the estimated operation time does not satisfy a threshold, generate and transmit, to at least one user device associated with the object tracking device, a notification.

21. The computer system of embodiment 20, wherein the notification comprises at least one of: an indication requesting reorientation of the object tracking device, an indication requesting an external power supply for the object tracking device, an indication of estimated operation time, an indication requesting a change of configuration for the object tracking device, an indication of a suggested change of configuration for the object tracking device, or an indication notifying a change of configuration for the object tracking device.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (for example, a computer readable storage medium) of the executing computing device, for execution by the computing device. The computer readable program instructions may execute entirely on a user's computer (for example, the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (for example, a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (for example, application-specific integrated circuits (ASICs)), programmable processors (for example, field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (for example, Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (for example, running on the user's computing system). Alternatively, data (for example, user interface data) necessary for generating the user interface may be provided by the server computing system to the browser, where the user interface may be generated (for example, the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. An object tracking device comprising:

one or more power storage devices;

a location determination device configured to generate location information associated with the object tracking device;

one or more wireless communication interfaces configured to provide wireless communications between the object tracking device and an external server system;

one or more computer-readable storage mediums configured to store:

information associated with a storage unit received from one or more sensors; and location information generated by the location determination device; and one or more processors configured to execute program instructions to cause the object tracking device to:

receive configuration information from the external server system;

implement the configuration information to, at least in part, adjust (1) a frequency of generating the location information associated with the object tracking device, and (2) an amount of power consumption per data transmission between the object tracking device and the external server system;

monitor a power level of at least one of the one or more power storage devices; and communicate, via at least one of the one or more wireless communication interfaces, at least some of the location information and the information associated with the storage unit to the external server system.

2. The object tracking device of claim 1, wherein the information associated with the storage unit comprises access information.

3. The object tracking device of claim 1, wherein the information associated with the storage unit comprises visual information.

4. The object tracking device of claim 1, wherein the information associated with the storage unit comprises temperature information.

5. The object tracking device of claim 1, wherein the storage unit comprises a trailer.

6. The object tracking device of claim 1, wherein communication with the external server system is wireless via at least cellular communications.

7. The object tracking device of claim 1, wherein the one or more wireless communication interfaces are further configured to provide wireless communications between the object tracking device and the one or more sensors, and wherein communication with the one or more sensors is wireless via at least bluetooth communications.

8. The object tracking device of claim 1, wherein the one or more sensors comprise two or more sensors.

9. The object tracking device of claim 1, wherein the one or more sensors comprise up to six sensors.

10. The object tracking device of claim 1, wherein the one or more sensors are configured to collect the information associated with the storage unit at time intervals.

11. The object tracking device of claim 10, wherein the time intervals comprise one minute intervals.

12. The object tracking device of claim 1, wherein the one or more sensors comprise temperature sensors.

13. The object tracking device of claim 1, wherein the external server system is configured to store information including an organization associated with the object tracking device.

14. The object tracking device of claim 1, wherein the external server system is configured to generate an alert based at least in part on the information associated with the storage unit.

15. The object tracking device of claim 1, wherein the object tracking device further comprises:

one or more solar power generation devices comprising one or more solar cells, wherein the one or more solar power generation devices provide power to at least one of the one or more power storage devices.

16. The object tracking device of claim 1, wherein the one or more processors are configured to execute the program instructions to further cause the object tracking device to:

implement the configuration information to, at least in part, operate the object tracking device, wherein the configuration information comprises an adjustment of at least one of: a frequency of data transmission between the object tracking device and the external server system, or network connectivity information associated with the object tracking device.

17. An object tracking device comprising:

one or more power storage devices;

a location determination device configured to generate location information associated with the object tracking device;

one or more wireless communication interfaces configured to provide wireless communications between the object tracking device and an external server system;

one or more computer-readable storage mediums configured to store:

temperature information associated with a trailer received from one or more temperature sensors; and location information generated by the location determination device; and one or more processors configured to execute program instructions to cause the object tracking device to:

receive configuration information from the external server system;

implement the configuration information to, at least in part, adjust (1) a frequency of generating the location information associated with the object tracking device, and (2) an amount of power consumption per data transmission between the object tracking device and the external server system;

monitor a power level of at least one of the one or more power storage devices; and communicate, via at least one of the one or more wireless communication interfaces, at least some of the location information and the temperature information associated with the trailer to the external server system.

18. The object tracking device of claim 17, wherein communication with the external server system is wireless via at least cellular communications, wherein the one or more wireless communication interfaces are further configured to provide wireless communications between the object tracking device and the one or more temperature sensors, and wherein communication with the one or more temperature sensors is wireless via at least bluetooth communications.

19. The object tracking device of claim 18, wherein the one or more temperature sensors are configured to collect the temperature information associated with the trailer at time intervals, and wherein the external server system is configured to generate an alert based at least in part on the temperature information associated with the trailer.

20. The object tracking device of claim 19, wherein the object tracking device further comprises:

one or more solar power generation devices comprising one or more solar cells, wherein the one or more solar power generation devices provide power to at least one of the one or more power storage devices;

wherein the one or more processors are configured to execute the program instructions to further cause the object tracking device to:

implement the configuration information to, at least in part, operate the object tracking device, wherein the configuration information comprises an adjustment of at least one of: a frequency of data transmission between the object tracking device and the external server system, network connectivity information associated with the object tracking device.

* * * * *